US009654262B2

(12) United States Patent
Centonza et al.

(10) Patent No.: US 9,654,262 B2
(45) Date of Patent: May 16, 2017

(54) METHODS PROVIDING BENEFIT METRICS FOR INTER BASE STATION COORDINATED MULTIPOINT COMMUNICATIONS

(71) Applicant: Telefonaktiebolaget L M Ericsson (publ), Stockholm (SE)

(72) Inventors: Angelo Centonza, Winchester (GB); Mattias Frenne, Uppsala (SE); George Jöngren, Sundbyberg (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/769,279

(22) PCT Filed: May 4, 2015

(86) PCT No.: PCT/SE2015/050487
§ 371 (c)(1),
(2) Date: Aug. 20, 2015

(87) PCT Pub. No.: WO2015/171054
PCT Pub. Date: Nov. 12, 2015

(65) Prior Publication Data
US 2016/0218841 A1 Jul. 28, 2016

Related U.S. Application Data

(60) Provisional application No. 61/988,484, filed on May 5, 2014, provisional application No. 62/000,972, filed on May 20, 2014.

(51) Int. Cl.
*H04L 5/00* (2006.01)
*H04W 72/12* (2009.01)
(Continued)

(52) U.S. Cl.
CPC ............ *H04L 5/0035* (2013.01); *H04B 7/024* (2013.01); *H04J 11/0053* (2013.01);
(Continued)

(58) Field of Classification Search
CPC .. H04W 72/04–72/1294; H04W 24/02–24/10; H04B 7/02–7/14; H04L 5/0035
See application file for complete search history.

(56) References Cited

U.S. PATENT DOCUMENTS

2015/0263834 A1 9/2015 Won et al.
2015/0312893 A1 10/2015 Prasad et al.
(Continued)

OTHER PUBLICATIONS

International Preliminary Report on Patentability, Application No. PCT/SE2015/050487, May 20, 2016.
(Continued)

*Primary Examiner* — Marcus R Smith
(74) *Attorney, Agent, or Firm* — Sage Patent Group

(57) ABSTRACT

A method may be provided to operate a first base station in a Radio Access Network including the first base station and a second base station. According to this method, a Reference Signal Received Power (RSRP) measurement list, a Coordinated Multipoint (CoMP) hypothesis, and a Benefit Metric may be communicated between the first and second base stations.

20 Claims, 18 Drawing Sheets

(51) Int. Cl.
*H04J 11/00* (2006.01)
*H04B 7/024* (2017.01)
*H04W 52/36* (2009.01)
*H04W 92/20* (2009.01)
*H04B 7/022* (2017.01)

(52) U.S. Cl.
CPC .......... *H04L 5/0007* (2013.01); *H04L 5/0073* (2013.01); *H04W 52/36* (2013.01); *H04W 72/1205* (2013.01); *H04W 72/1252* (2013.01); *H04W 72/1273* (2013.01); *H04B 7/022* (2013.01); *H04W 92/20* (2013.01)

(56) References Cited

U.S. PATENT DOCUMENTS

| | | | | |
|---|---|---|---|---|
| 2015/0312903 | A1* | 10/2015 | Prasad | H04B 7/024 370/329 |
| 2016/0036571 | A1* | 2/2016 | Park | H04B 7/024 370/330 |
| 2016/0182198 | A1* | 6/2016 | Won | H04L 5/0035 370/329 |

OTHER PUBLICATIONS

International Search Report and Written Opinion Corresponding to International Application No. PCT/SE2015/050487; Date of Mailing: Aug. 3, 2015; 11 Pages.

International Search Report and Written Opinion Corresponding to International Application No. PCT/SE2015/050488; Date of Mailing: Jul. 31, 2015; 12 Pages.

Samsung "Further evaluation results for inter-eNB CoMP", 3GPP TSG-RAN WG1 Meeting #76bis, R1-141806, Shenzhen, China, Mar. 31-Apr. 4, 2014, 5 Pages.

Alcatel-Lucent et al. "Signalling Details and Procedures Supporting eCoMP", 3GPP TSG RAN WG1 Meeting #76bis, R1-141725, Shenzhen, China, Mar. 31-Apr. 4, 2014, 9 Pages.

LG Electronics "Inter-eNB CoMP signaling with non-ideal backhaul", 3GPP TSG RAN WG1 Meeting #76bis, R1-141836, Shenzhen, China, Mar. 31-Apr. 4, 2014, 6 Pages.

Samsung et al. "Way forward on Inter-eNB CoMP for LTE", 3GPP TSG-RAN1 #76bis Meeting, R1-141809, Shenzhen, China, Mar. 31-Apr. 4, 2014, 3 Pages.

Qualcomm Incorporated "Parameters for backhaul signaling", 3GPP TSG-RAN WG1 Meeting #76, R1-141445, Shenzhen, China, Mar. 31-Apr. 4, 2014, 6 Pages.

ZTE "Remaining details on inter-eNB CoMP Signalling", 3GPP TSG RAN WG1 Meeting #76bis, R1-141408, Shenzhen, China, Mar. 31-Apr. 4, 2014, 4 Pages.

Qualcomm Incorporated "Inter-eNB CoMP: Hypotheses and Benefit Metric exchange", 3GPP TSG-RAN WG3 Meeting #84, R3-141175, Seoul, South Korea, May 19-23, 2014, 6 Pages.

Lee "LS on Inter-eNB CoMP for LTE", 3GPP TSG RAN WG1 Meeting #76bis, R1-141816, Shenzhen, China, Mar. 31-Apr. 4, 2014, 2 Pages.

3GPP TS 36.423 V12.0.0 (Dec. 2013) $3^{rd}$ Generation Partnership Project; Technical Specification Group Radio Access Network; Evolved Universal Terrestrial Radio Access Network (E-UTRAN); X2 application protocol (X2AP)(Release 12), 650 Route des Lucioles, Sophia Antipolis, Valbonne, France; 144 pages.

3GPP TS 36.213 V11.3.0 (Jun. 2013) $3^{rd}$ Generation Partnership Project; Technical Specification Group Radio Access Network; Evolved Universal Terrestrial Radio Access (E-UTRA); Physical layer procedures (Release 11), 650 Route des Lucioles, Sophia Antipolis, Valbonne, France; 176 pages.

U.S. Appl. No. 61/972,425, filed Mar. 31, 2014, Park et al.

* cited by examiner

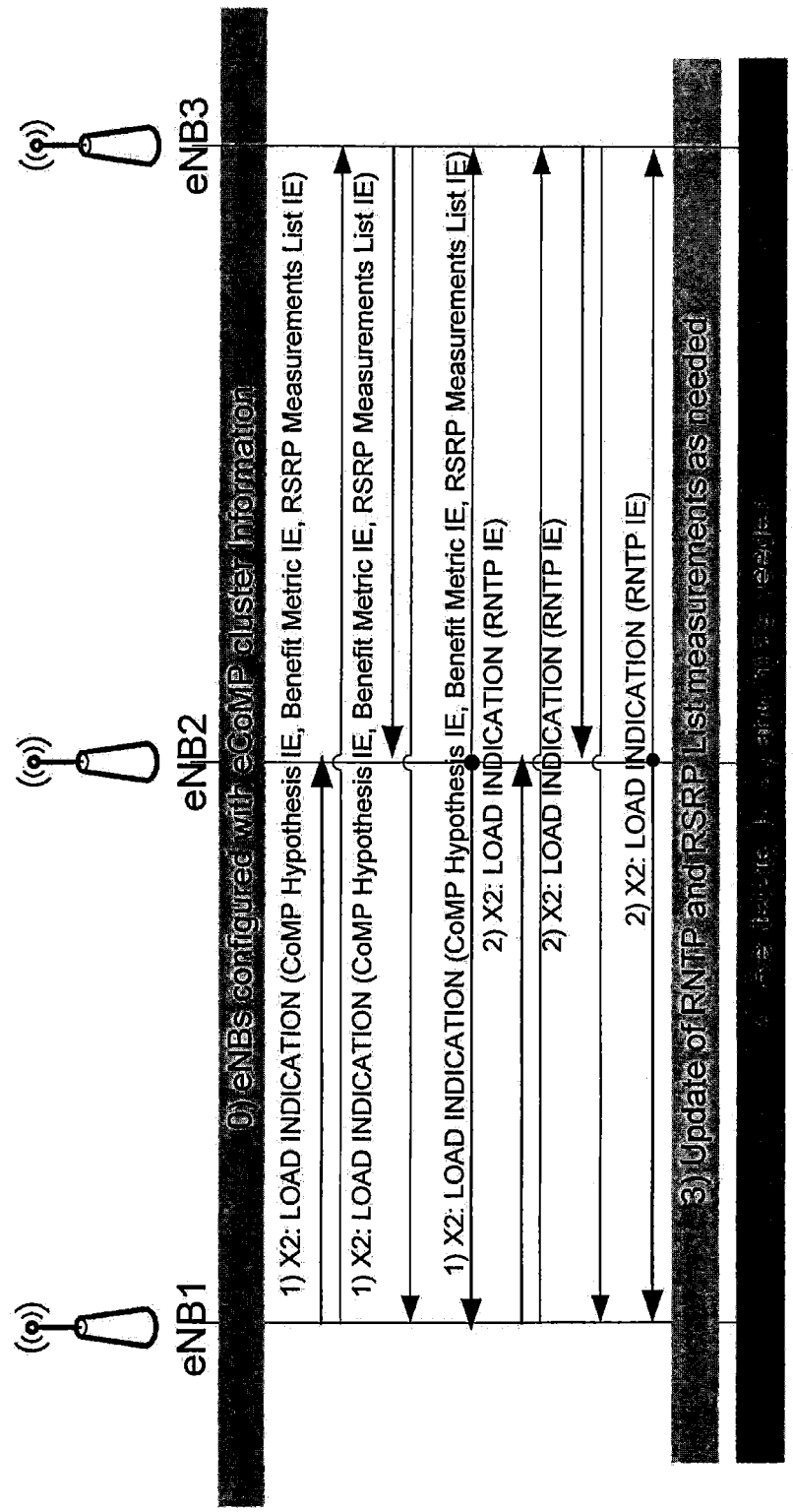

Figure 9A

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1..<maxCellineNB> | | | EACH | ignore |
| >>Cell ID | M | | ECGI 9.2.14 | Id of the source cell | -- | -- |
| >>UL Interference OverloadIndication | O | | 9.2.17 | | -- | -- |
| >>UL High Interference Information | O | 0..<maxCellineNB> | | | -- | -- |
| >>>Target Cell ID | M | | ECGI 9.2.14 | Id of the cell for which the HII is meant | -- | -- |
| >>>UL High Interference Indication | M | | 9.2.18 | | -- | -- |
| >>Relative Narrowband Tx Power (RNTP) | O | | 9.2.19 | | -- | -- |
| >>ABS Information | O | | 9.2.54 | | YES | ignore |
| >>Invoke Indication | O | | 9.2.55 | | YES | ignore |

Figure 9B

| IE Group Name | Presence | Range | IE type and reference | Semantics description | Criticality | Assigned Criticality |
|---|---|---|---|---|---|---|
| >>CoMP Hypothesis | O | | | Estimated resources for Inter eNB CoMP coordination | YES | ignore |
| >>BenefitMetric | O | | | Estimated benefit assuming inter eNB CoMP coordination is achieved | YES | ignore |
| RSRP Measurements List | | 0..<maxRSRPMeasurements> | | | YES | ignore |
| >eNB-UE-X2AP-ID | M | | | X2AP ID of the UE reporting the RSRP measurement | | |
| >Cell ID | M | | ECGI 9.2.14 | ECGI of the cell measured by the UE | | |
| >RSRP Measurement | M | | | RSRP value measured by the UE for the ECGI indicated | | |

Figure 10A

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1..<maxCellineNB> | | | EACH | ignore |
| >>Cell ID | M | | ECGI 9.2.14 | Id of the source cell | -- | -- |
| >>UL Interference Overload Indication | O | | 9.2.17 | | -- | -- |
| >>UL High Interference Information | | 0..<maxCellineNB> | | | -- | -- |
| >>>Target Cell ID | M | | ECGI 9.2.14 | Id of the cell for which the HII is meant | -- | -- |
| >>>UL High Interference Indication | M | | 9.2.18 | | -- | -- |
| >>Relative Narrowband Tx Power (RNTP) | O | | 9.2.19 | | -- | -- |
| >>ABS Information | O | | 9.2.54 | | YES | ignore |
| >>Invoke Indication | O | | 9.2.55 | | YES | ignore |
| >>Inter eNB Coordination Info | O | | -- | Used for inter eNB CoMP Coordination | YES | ignore |

Figure 10B

| IE/Group Name | Presence | Range | IE type and reference | Semantics description | Criticality | Assigned Criticality |
|---|---|---|---|---|---|---|
| CoMP Hypothesis | M | | | Estimated resources for inter eNB CoMP coordination | YES | ignore |
| Benefit Metric | M | | | Estimated benefit assuming Inter eNB CoMP coordination is achieved | YES | ignore |
| RSRP Measurements List | | 0.. <maxRSRPMeasurements> | | | YES | ignore |
| >eNB-UE-X2AP-ID | M | | | X2AP ID of the UE reporting the RSRP measurement | | |
| >Cell ID | M | | ECGI 9.2.14 | ECGI of the cell measured by the UE | | |
| >RSRP Measurement | M | | | RSRP value measured by the UE for the ECGI indicated | | |

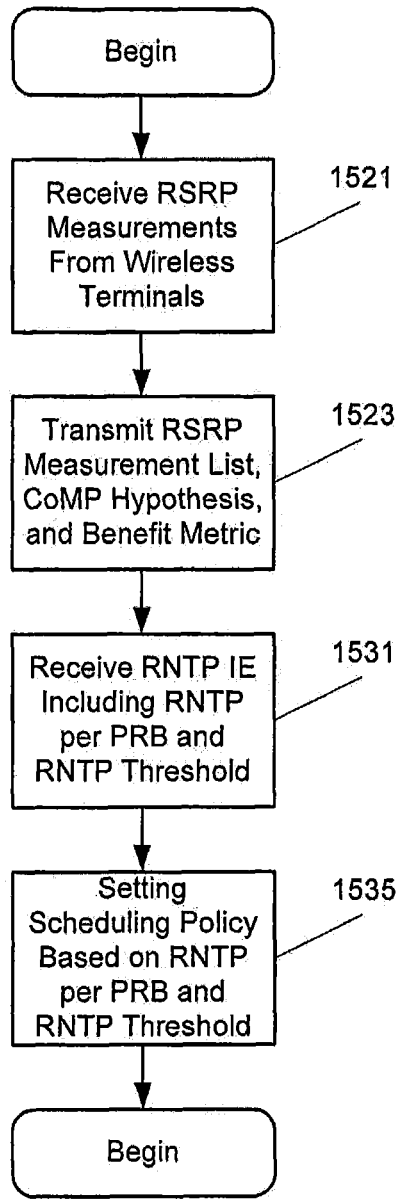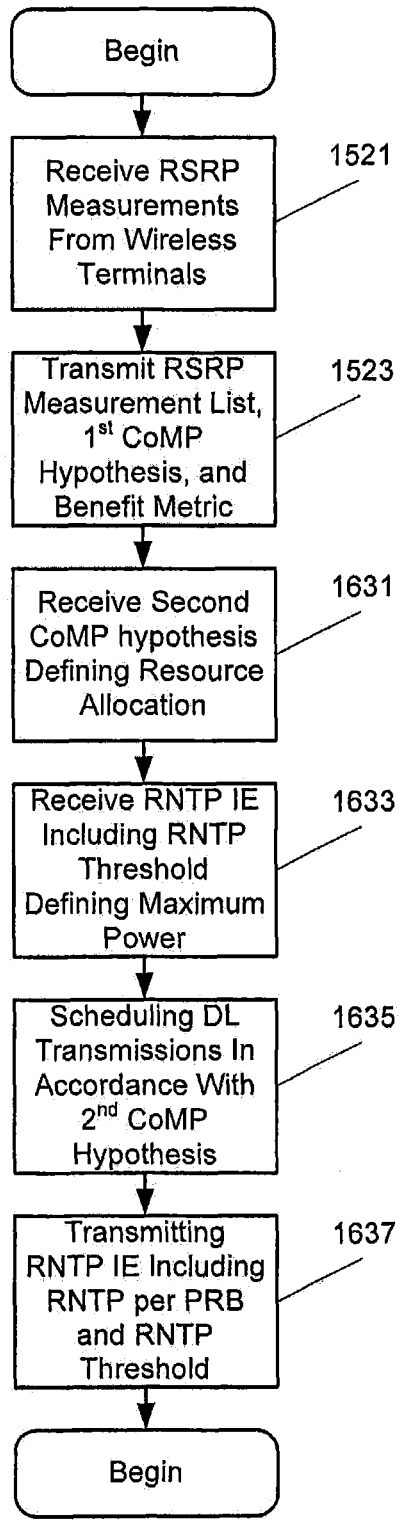

METHODS PROVIDING BENEFIT METRICS FOR INTER BASE STATION COORDINATED MULTIPOINT COMMUNICATIONS

CROSS REFERENCE TO RELATED APPLICATION

This application is a 35 U.S.C. §371 national stage application of PCT International Application No. PCT/SE2015/050487, filed in the English language on 4 May 2015, which itself claims priority to U.S. Provisional Application No. 61/988,484 filed 5 May 2014 and U.S. Provisional Application No. 62/000,972 filed 20 May 2014. The disclosures and contents of all of the above referenced applications are incorporated by reference herein in their entirety.

BACKGROUND

The third generation partnership project (3GPP) is currently working on standardization of Release 12 of Long Term Evolution (LTE) concepts. The architecture of an LTE system is shown in FIG. 1, which illustrates logical interfaces between eNBs (X2) and between eNB and MME/S-GW (S1), including radio access nodes (eNBs or eNodeBs) and evolved packet core nodes (MME/S-GW). As can be seen, an S1 interface(s) connects eNBs to the MME/S-GW(s), while an X2 interface(s) connects peer eNBs.

The management system assumed in embodiments of inventive concepts is shown in FIG. 2. The node elements (NE), also referred to as eNodeB, are managed by a domain manager (DM), also referred to as the operation and support system (OSS). A DM may further be managed by a network manager (NM). Two NEs are interfaced using an X2 interface, whereas the interface between two DMs is referred to as an Itf-P2P interface. The management system may configure the network elements, as well as receive observations associated with features in the network elements. For example, DM observes and configures NEs, while NM observes and configures DM, as well as NE via DM.

By means of configuration via the DM, NM, and/or related interfaces, functions over the X2 and S1 interfaces can be carried out in a coordinated way throughout the RAN (Radio Access Network), eventually involving the Core Network, i.e. MME and S-GWs.

The physical layer transmission in LTE uses OFDM (Orthogonal Frequency-Division Multiplexing) in the downlink and DFT-spread (Discrete Fourier Transform spread) OFDM in the uplink. The basic LTE physical resource can thus be seen as a time-frequency grid as illustrated in FIG. 3, where each resource element corresponds to one subcarrier during one OFDM symbol interval.

In the time domain, LTE downlink transmissions are organized into radio frames of 10 ms (milliseconds), each radio frame consisting of ten equally-sized subframes of 1 ms as illustrated in FIG. 4. A subframe is divided into two slots, each of 0.5 ms time duration.

The resource allocation in LTE is described in terms of resource blocks (RB), also referred to as physical resource blocks or PRBs, where an RB corresponds to one slot in the time domain and 12 contiguous 15 kHz subcarriers in the frequency domain. Two in time consecutive RBs represent an RB pair and corresponds to the time interval upon which scheduling operates.

Transmissions in LTE are dynamically scheduled in each subframe where the base station (also referred to as eNodeB or eNB) transmits downlink assignments/uplink grants to certain UEs via the physical downlink control channel (PDCCH), or the enhanced PDCCH (EPDCCH) introduced in LTE Rel.11. In LTE downlink, data is carried by the physical downlink shared channel (PDSCH) and in the uplink the corresponding link is referred to as the physical uplink shared channel (PUSCH). The PDCCHs are transmitted in the first OFDM symbol(s) in each subframe and spans (more or less) the whole system bandwidth, whereas EPDCCH is mapped on RBs within the same resource region as used for PDSCH. Hence, EPDCCHs are multiplexed in the frequency domain with the PDSCH and it may be allocated over the entire subframe. A UE that has decoded an assignment carried by a PDCCH, or EPDCCH, knows which resource elements in the subframe contain data aimed for the UE. Similarly, upon receiving an uplink grant, the UE knows upon which time/frequency resources it should transmit upon.

Demodulation of sent data requires estimation of the radio channel which is done using transmitted reference symbols (RS), i.e. symbols known by the receiver. In LTE, cell specific reference symbols (CRS) are transmitted in all downlink subframes and in addition to assisting downlink channel estimation, they are also used for mobility measurements performed by the UEs. LTE also supports UE specific RS, i.e. demodulation reference signals (DMRS), to assist channel estimation for demodulation purposes only and channel state information RS (CSI-RS) used for channel feedback purpose only.

FIG. 5 illustrates mapping of PDCCH and PDSCH and CRS on resource elements within an LTE downlink subframe. In this example, the PDCCHs occupy the first out of three possible OFDM symbols, so in this particular case the mapping of data carried by PDSCH could start already at the second OFDM symbol. Since the CRS is common to all UEs in the cell, the transmission of CRS cannot be easily adapted to suit the needs of a particular UE. This is in contrast to DMRS which means that each UE has reference signals of its own placed in the data region of FIG. 5 as part of PDSCH. In LTE, subframes can be configured as MBSFN (Multicast-broadcast single-frequency network) subframes which implies that CRSs are only present in the PDCCH control region.

The length of the PDCCH control region, which can vary on a subframe basis, is conveyed in the physical control format indicator channel (PCFICH). The PCFICH is transmitted within this control region, at locations known by UEs. After a UE has decoded the PCFICH, it thus knows the size of the control region and in which OFDM symbol the data transmission starts. The physical hybrid-ARQ indicator channel (PHICH) is also transmitted in the control region. This channel carries ACK/NACK responses to a UE to inform if the uplink data transmission in a previous subframe was successfully decoded by the base station or not.

In the black and white rendering of FIG. 5, the shading for cell specific RS blocks and control blocks may be difficult to distinguish. This figure shows the CRS for the case of four CRS ports at the eNB. The cell specific RS blocks are shown in the 2nd, 5th, 8th, 11th, and 14th rows (from the bottom to the top) of the 1st, 5th, 8th, and 12th columns (from the left to the right). The control blocks are shown in the 1st, 3rd, 4th, 6th, 7th, 9th, 10th, 12th, 13th, 15th, and 16th rows (from the bottom to the top) of the 1st column (from the left). The 2nd and 3rd columns (from the left) may be columns of control or data blocks depending on the length of the control region.

Interference mitigation on the transmitter side refers to methods that aim to coordinate the physical channel transmissions across cells to reduce/avoid severe interference. A simple example is when an aggressor base station occasionally mutes its transmissions on certain radio resources in order for a victim cell to schedule interference sensitive UEs on radio resources with reduced interference. LTE features to coordinate transmissions have been specified in the context of inter-cell interference coordination (ICIC) and coordinated multipoint transmissions (CoMP). In the case of ICIC, an eNB sends a message over the LTE inter-eNB interface X2 with coordination information that a receiving eNB can take into account when scheduling interference sensitive users. In the case of CoMP, a cluster of transmission points, or base stations, can jointly and synchronously transmit the same signals to a UE to increase the received power on the desired signals, or it can as in the ICIC case coordinate the transmissions to reduce/avoid inter-point interference.

Over the X2 interface, procedures have been defined to support exchange of information enabling interference coordination. One of such procedures is the X2 Load Indication procedure shown in FIG. 6.

The LOAD INFORMATION message carries a number of IEs related to load and utilization in the sending eNB's cell. Some of the information carried by this message are described below and specified in 3GPP TS 36.423 V12.0.0, "X2 Application Protocol," December 2013:

UL Overload Interference Indication (OII) indicates per RB the interference level (low, medium, high) experienced by the indicated cell on all RBs.

UL High Interference Indication (HII) indicates per RB the occurrence of high interference sensitivity, as seen from the sending eNB.

Received Narrow Transmit Power (RNTP) indicates per RB whether DL transmission power is lower than the value indicated by a threshold.

Almost Blank Subframe (ABS) pattern indicating the subframes the sending eNB will reduce power on some physical channels and/or reduced activity.

The X2 IEs OII, HII and RNTP were specified in LTE Rel.8 and represent methods for coordinating physical data channel transmissions in the frequency domain across cells. The ABS IE, however, was specified in LTE Rel.10 as a time domain mechanism to primarily protect reception of PDCCH, PHICH and PDSCH in the small cells by letting macro cells occasionally mute, or reduce transmit power on PDCCH/PDSCH in certain subframes. The eNB ensures backwards compatibility towards UEs by still transmitting necessary channels and signals in the ABS for acquiring system information and time synchronization.

In R1-141816, LS on Inter-eNB CoMP for LTE, Release 12, March 2014, 3GPP RAN1 agreed to base the Inter eNB CoMP solution on signaling of the following information over X2 in Rel-12 LTE:

One or more CoMP hypotheses, each comprising a hypothetical resource allocation associated with a cell ID, where the cell identified by the cell ID is not necessarily controlled by the receiving eNB How to react to a received CoMP hypothesis signaling is up to receiving eNB's implementation. E.g. accept or ignore, potentially sending a feedback, e.g. "yes/ no" to the sending node.

RAN1 guidance to RAN3 on necessary granularity and rate of CoMP hypothesis in time/frequency domain:

Signaling period: RAN1's recommendation is 5, 10, 20, 40, 80 ms or aperiodic

If aperiodic, a validity period for the information should be included

RAN3 to specify the exact periodicities taking into account limitation of existing X2 interface Per RB with time granularity per cell Time granularity could be one or multiple subframe level A benefit metric associated with one or more CoMP hypothesis/es, quantifying the benefit that a cell of the sender node expects in its scheduling when the associated CoMP hypothesis/es is assumed The range of benefit metric in the X2 message should be specified The method of deriving the cell-specific benefit metric is up to each eNB implementation RAN1 guidance to RAN3:

Necessary time/frequency granularity and signaling period: Same as the associated CoMP hypothesis/ es RSRP measurement reports of one or more UEs RAN1 guidance to RAN3:

Time domain granularity of the signaling: event triggered or periodic exchange, with periodicities 120, 240, 480, 640 ms.

Mechanism to provide RSRP report upon request from an eNB should be made available Per cell in sending eNB identified by cell ID:

Per UE identified by a UE ID, e.g. eNB-UE-X2-APID:

One or more set(s) of {RSRP and cell ID} (maximum number of set(s) equals eight)

Note: CoMP signaling needs to be associated with a carrier frequency identity.

The X2 interface, like the S1 interface, supports two types of procedures. They are defined in 3GPP TS 36.423 V12.0.0, "X2 Application Protocol," December 2013, as below:

Elementary Procedure: X2AP protocol consists of Elementary Procedures (EPs). An X2AP Elementary Procedure is a unit of interaction between two eNBs. An EP consists of an initiating message and possibly a response message. Two kinds of EPs are used:

Class 1: Elementary Procedures with response (success or failure),

Class 2: Elementary Procedures without response.

Class one procedures are typically used for functions that require confirmation from the receiving node of reception of a message and acknowledgement of an assumed behavior, or response with certain related information.

Class two procedures are typically used for functions where the sending node does not necessarily need to know of a behavior assumed by the receiving node and/or for functions where the information sent by the sending node have a limited life span and would require updating within a relatively short amount of time.

3GPP is currently working on support for Inter eNB CoMP for LTE with non Ideal Backhaul. An agreement has been taken in 3GPP to base solutions for Inter eNB CoMP on the use of the X2 interface and the new Rel-12 X2 signaling is described above. Accordingly, the continues to exist a need in the art for methods and devices providing improved interference mitigation.

SUMMARY

According to some embodiments of inventive concepts, a method may be provided to operate a first base station in a Radio Access Network including the first base station and a second base station. According to this method, a Reference Signal Received Power (RSRP) measurement list, a Coordinated Multipoint (CoMP) hypothesis, and a Benefit Metric may be communicated between the first and second base stations.

By providing the Reference Signal Received Power measurement list, the receiving base station can separately evaluate the benefit metric when deciding whether/how to apply the CoMP hypothesis. If the RSRP measurement list does not support the benefit metric determined by the transmitting base station, the receiving base station may deviate from the CoMP hypothesis received from the transmitting base station to favor a CoMP hypothesis received from another base station and/or to favor its own downlink transmissions.

For example, communicating may include transmitting the Reference Signal Received Power (RSRP) measurement list, the Coordinated Multipoint (CoMP) hypothesis, and the Benefit Metric from the first base station to the second base station. The CoMP hypothesis may define a hypothetical resource allocation, and the Benefit Metric may define a benefit to the first base station associated with the hypothetical resource allocation defined by the CoMP hypothesis. The hypothetical resource allocation of the CoMP hypothesis may be associated with the second base station.

RSRP measurements may be received from wireless terminals at the first base station (BS-A), and the RSRP measurement list may be based on the RSRP measurements received from the wireless terminals.

In addition, a Relative Narrowband Transmission Power (RNTP) Information Element (IE) may be received including a RNTP per physical resource block (PRB) and a RNTP threshold. The RNTP threshold may indicate a downlink transmission power threshold for the second base station, and the RNTP per PRB may indicate on a physical resource block basis for the second base station physical resource blocks for which downlink transmission is below the downlink transmission power indicated by the second RNTP threshold and/or physical resource blocks for which downlink transmission is above the downlink transmission power indicated by the second RNTP threshold. A scheduling policy for downlink transmissions from the first base station may be set based on consideration of the RNTP per PRB and the RNTP threshold.

The CoMP hypothesis may be a first CoMP hypothesis, and a second CoMP hypothesis may be received from the second base station, with the second CoMP hypothesis defining a resource allocation for downlink transmissions from the first base station. Downlink transmissions from the first base station may be scheduled in accordance with the second CoMP hypothesis. A Relative Narrowband Transmission Power (RNTP) Information Element (IE) may be received, with the RNTP IE including a dummy value in a RNTP per physical resource block (PRB) and a RNTP threshold, and with the dummy value identifying the RNTP threshold as defining a maximum power for interference protected resources identified by the second CoMP hypothesis for downlink transmission from the first base station. Moreover, the RNTP IE may be a first RNTP IE, and a second RNTP IE may be transmitted including a second RNTP per physical resource block (PRB) and a second RNTP threshold. The second RNTP threshold may indicate a downlink transmission power threshold for the first base station and the second RNTP per PRB may indicate on a physical resource block basis for the first base station physical resource blocks for which downlink transmission is below the downlink transmission power indicated by the second RNTP threshold and/or physical resource blocks for which downlink transmission is above the downlink transmission power indicated by the second RNTP threshold.

Communicating may include receiving the Reference Signal Received Power (RSRP) measurement list, the Coordinated Multipoint (CoMP) hypothesis, and the Benefit Metric at the first base station from the second base station. The CoMP hypothesis may define a hypothetical resource allocation, and the Benefit Metric may define a benefit to the second base station associated with the hypothetical resource allocation defined by the CoMP hypothesis. The hypothetical resource allocation defined by the CoMP hypothesis may be associated with the first base station.

The RSRP measurement list may be based on RSRP measurements transmitted by wireless terminals to the second base station, and downlink transmissions may be scheduled based on the RSRP measurement list, the CoMP hypothesis, and the Benefit Metric. Moreover, scheduling may include evaluating a real benefit to the second base station based on the RSRP measurement list and the Benefit Metric.

The RSRP measurement list may be a first RSRP measurement list, the CoMP hypothesis may be a first CoMP hypothesis, and the Benefit Metric may be a first Benefit Metric. In addition, a second RSRP measurement list, a second CoMP hypothesis, and a second Benefit Metric may be received from a third base station, and downlink transmissions may be scheduled based on the first and second RSRP measurement lists, the first and second CoMP hypotheses, and the first and second Benefit Metrics. Moreover, the first and second Benefit Metrics may be normalized based on the first and second RSRP measurement lists to determine normalized first and second Benefit Metrics, and scheduling may include scheduling downlink transmissions based on the first and second RSRP measurement lists, the first and second CoMP hypotheses, and the normalized first and second Benefit Metrics.

Scheduling may include scheduling downlink transmissions of the first base station. In addition, a Relative Narrowband Transmission Power (RNTP) Information Element (IE) may be transmitted including a RNTP per Physical resource block (PRB) and a RNTP threshold. The RNTP threshold may indicate a downlink transmission power threshold for the first base station and the RNTP per PRB may indicate on a physical resource block basis for the first base station physical resource blocks for which downlink transmission is below the downlink transmission power indicated by the second RNTP threshold and/or physical resource blocks for which downlink transmission is above the downlink transmission power indicated by the second RNTP threshold.

The CoMP hypothesis may be a first CoMP hypothesis, and a second CoMP hypothesis may be transmitted to the second base station, with the second CoMP hypothesis defining a resource allocation for downlink transmissions from the second base station. A Relative Narrowband Transmission Power (RNTP) Information Element (IE) may be transmitted including a dummy value in a RNTP per physical resource block (PRB) and a RNTP threshold. The dummy value may identify the RNTP threshold as defining a maximum power for interference protected resources identified by the second CoMP hypothesis for downlink transmission from the second base station.

The RNTP IE may be a first RNTP IE, and a second RNTP IE may be transmitted including a second RNTP per physical resource block (PRB) and a second RNTP threshold, wherein the second RNTP threshold indicates a downlink transmission power threshold for the first base station and the second RNTP per PRB indicates on a physical resource block basis for the first base station physical resource blocks for which downlink transmission is below the downlink transmission power indicated by the second RNTP threshold and/or physical resource blocks for which downlink transmission is above the downlink transmission power indicated by the second RNTP threshold.

A third CoMP hypothesis may be transmitted to a third base station, with the third CoMP hypothesis defining a resource allocation for downlink transmissions from the third base station.

In addition, the first Benefit Metric may be normalized based on the first and second RSRP measurement lists to determine a normalized first Benefit Metric, and scheduling may include scheduling downlink transmissions based on the first RSRP measurement list, the first CoMP hypothesis, and the normalized first Benefit Metric.

Communicating the RSRP measurement list, the CoMP hypothesis, and the Benefit Metric may include communicating the RSRP measurement list, the CoMP hypothesis, and the Benefit Metric between the first and second base stations over an X2 Interface. Communicating the RSRP measurement list, the CoMP hypothesis, and the Benefit Metric may include communicating the RSRP measurement list, the CoMP hypothesis, and the Benefit Metric between the first and second base stations as elements of a Load Information message. Moreover, the CoMP hypothesis may identify downlink resources for interference protection.

According to some other embodiments of inventive concepts, a Radio Access Network (RAN) may include a first base station and a second base station. Moreover, the first base station may be adapted to communicate a Reference Signal Received Power (RSRP) measurement list, a Coordinated Multipoint (CoMP) hypothesis, and a Benefit Metric between the first and second base stations.

According to still other embodiments of inventive concepts, a Radio Access Network (RAN) may include the first base station and a second base station. The first base station may include a transceiver configured to provide radio communications with a plurality of wireless terminals, a network interface configured to provide communications with other base stations of the RAN, and a processor coupled to the transceiver and the network interface. The processor may be adapted to communicate a Reference Signal Received Power (RSRP) measurement list, a Coordinated Multipoint (CoMP) hypothesis, and a Benefit Metric between the first and second base stations.

BRIEF DESCRIPTION OF THE DRAWINGS

FIG. 8 is a message diagram illustrating examples of X2 based distribution for inter base station CoMP according to some embodiments of inventive concepts.

FIGS. 9A and 9B provide a table illustrating an example a Load Information message according to some embodiments of inventive concepts.

FIGS. 10A and 10B provide a table illustrating an example of IE encoding in a Load Information message according to some embodiments of inventive concepts.

FIGS. 15-18 are flow charts illustrating operations of base stations according to some embodiments of inventive concepts.

DETAILED DESCRIPTION

Figure 1:
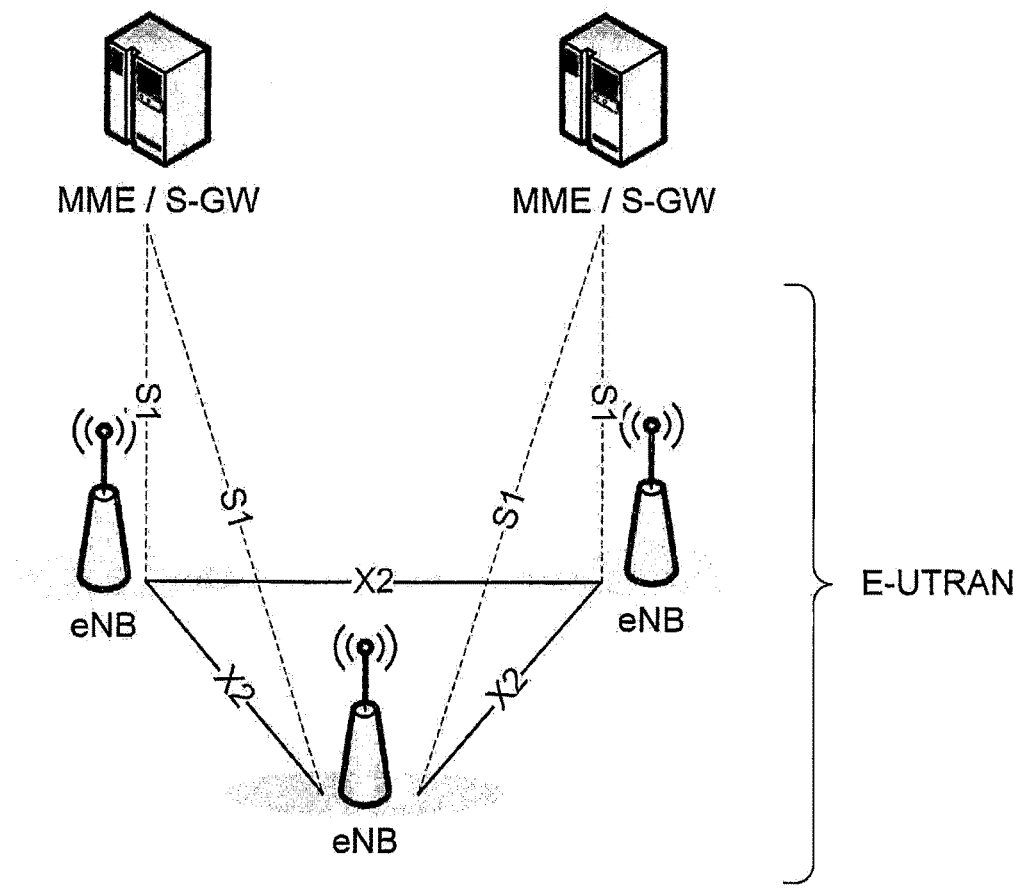
FIG. 1 is a schematic diagram illustrating LTE architectures with X2 logical interfaces between base stations eNBs and with S1 logical interfaces between base stations eNBs and MME/S-GW.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN that communicates over radio communication channels with wireless terminals (also referred to as UEs). It will be understood, however, that inventive concepts are not limited to such embodiments and may be embodied generally in any type of communication network. As used herein, a legacy or non-legacy wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

Note that although terminology from 3GPP (3rd Generation Partnership Project) LTE (Long Term Evolution) has been used in this disclosure to provide examples embodiments of inventive concepts, this should not be seen as limiting the scope of inventive concepts to only the aforementioned system. Other wireless systems, including WCDMA, WiMax, UMB and GSM, may also benefit from exploiting ideas/concepts covered within this disclosure.

Also, note that terminology such as eNodeB (also referred to as a base station) and UE (also referred to as a wireless terminal) should be considered non-limiting and does not imply a certain hierarchical relation between the two. In general, "eNodeB" could be considered as a first device and "UE" could be considered as a second device, and these two devices may communicate with each other over some radio channel Similarly, when talking about signaling over an X2 backhaul, inventive concepts are not limited to communication between eNBs. but the communicating nodes can be any node terminating the backhaul interface over which the information described is transmitted.

Providing Inter eNB CoMP signaling with a non Ideal Backhaul based on only the existing X2 signaling and the new X2 signaling listed above may be difficult. Reducing/minimizing signaling between eNBs may be desired without impact and/or with reduced impact due to variation of backhaul delays and/or jitter, and while maintaining resilience to packet losses.

Reduction/avoidance of misuse in the signaling may be desired, in the sense that a first node is requesting a second node to unnecessary mute too many resources, at the benefit of the first node only.

Information in an RNTP (Relative Narrowband Transmit Power) IE (Information Element) may not be refreshed when a new RNTP IE is received, but it may be refreshed on a per RNTP Threshold IE basis. Namely, more than one RNTP IEs can be used between two peer nodes connected via X2 RNTP IE. Hence, the RNTP IE with a specific RNTP Threshold IE may be refreshed only when a new RNTP IE with the same RNTP Threshold IE is received. This may allow also for exchanging and/or storing of scheduling information with higher granularity than in prior art.

In some embodiments of inventive concepts, the RSRP Measurement List is used to determine the interference protection level and scheduling policies for eCoMP cluster coordination. These can be used by the receiving node to evaluate the real benefit, need for interference protection, and/or level of mitigation to be applied, and/or to reduce/avoid misuse of the CoMP hypothesis signaling. An example may be to use the RSRP (Reference Signal Received Power) measurements to normalize the benefit metric IEs received.

Some embodiments of inventive concepts may: provide coordination using existing and new signaling over X2 interfaces to improve system performance and user throughput performance; provide ways to detect misuse of X2 signaling which could create instability in the coordination between nodes; provide support of Inter eNB CoMP with non Ideal Backhaul both in distributed and centralized schemes; provide reduction/minimization of signaling between involved nodes and/or provide flexibility to either empower one or a few nodes with the role of coordinator, and/or to allow each node to behave independently from neighbors; and/or provide a self converging system where UEs in need of interference mitigation could be addressed and performance could be improved.

Embodiments of inventive concepts may include signaling mechanisms to enable support of Inter eNB CoMP in a distributed architecture and/or in a centralized architecture.

Embodiments of inventive concepts may use an X2 interface procedure not involving a response message, also known as a Class 2 procedure. The latter may reduce the amount of signaling and/or may leave freedom to each node on when to trigger signaling of information without the need for a receiving node to follow a behavior suggested by the sender, i.e. maintaining the peer to peer nature of the X2 interface.

It shall be noted that the same methods can also be enabled with procedures involving a response message, i.e. Class 1. In the case of adoption of a Class 1 procedure between node 1 and node 2, the response message from node 2 to node 1 may carry part or all of the information that would otherwise be sent via a single class two message according to the methods described in embodiments of inventive concepts.

The RNTP IE is currently used in X2 signaling for DL (DownLink) interference coordination. Hence the use of such an IE for Inter eNB resource allocation coordination is in line with design principles of this IE.

The standard in 3GPP TS 36.423 V12.0.0, "X2 Application Protocol," December 2013, currently quotes the following regarding reception of the RNTP information: "If the Relative Narrowband Tx Power (RNTP) IE (Information Element) is received in the LOAD INFORMATION message, it indicates, per PRB (Physical Resource Block or Resource Block), whether downlink transmission power is lower than the value indicated by the RNTP Threshold IE. The receiving eNB may take such information into account when setting its scheduling policy and shall consider the received Relative Narrowband Tx Power (RNTP) IE value valid until reception of a new LOAD INFORMATION message carrying an update."

In some embodiments of inventive concepts using RNTP, the information in the RNTP IE may not be refreshed when a new RNTP IE is received, but it may be refreshed on a per RNTP Threshold IE basis. Namely, more than one RNTP IEs can be used between two peer nodes connected via X2, and in the particular case of centralized schemes, more than one RNTP IE can be used in an eCoMP neighborhood.

As an example, in the RNTP IE one RNTP Threshold IE and consequent associated RNTP Per PRB IE may be used for legacy DL coordination functions and another set of such parameters, established either per eCoMP cluster or per peer to peer X2 connection, for eCoMP. Hence, the RNTP IE with a specific RNTP Threshold IE may be refreshed only when a new RNTP IE with the same RNTP Threshold IE is received. The latter would allow also for exchanging and storing of scheduling information with higher granularity.

According to the latter method, the RNTP IE becomes a tool to control coordinated scheduling in an eCoMP cluster. As the need for interference protection of each node in the cluster changes, the latter being highlighted by CoMP Hypothesis, Benefit Metric and RSRP Measurement List, a central coordinator can recommend to different nodes in the cluster a new RNTP IE where the at least RNTP Threshold IE is considered as a new maximum transmission power for the resources in need of protection.

In some other embodiments using RNTP, the technique of RNTP embodiments discussed above are used in a distributed scheme (i.e., without central coordinator), where nodes can send a new RNTP IE to their peers with the purpose of recommending at least a new RNTP Threshold IE to the receiving node. The latter can, for example, be achieved by providing a dummy value for the RNTP Per PRB IE, which signifies that only the RNTP Threshold IE should be considered as a recommendation of the maximum power to be used in interference protected resources. Alternatively or in combination, the RNTP threshold could affect the meaning of CoMP hypothesis IE. For example, it could be used to set the maximum power assumed for resources considered used in the hypothetical resource allocation. Another option is to use the RNTP threshold to set the maximum power level for the resources considered not to be used.

When transmitting an RNTP IE, one of a set of RNTP per PRB values is assigned to the RNTP per PRB for the RNTP IE. Each of a subset of the set of RNTP per PRB values defines respective resource blocks on a physical resource block basis for which downlink transmission is below a downlink transmission power threshold and/or physical resource blocks for which downlink transmission power is above a downlink transmission power threshold. The dummy value (discussed above) is used to signify that the RNTP Threshold IE should be considered as a recommendation of the maximum power to be used in interference protected resources, and the dummy value is included in the set of values assigned to the RNTP per PRB for an RNTP IE and excluded from the subset of values defining resource blocks.

A generalization of such use of the RNTP IE could be made with regards to any resource that should be protected from interference. For example, such use of the RNTP, with an opportunely set value of the RNTP Threshold IE, could be made in combination with Almost Blank Subframes (ABS), where the recommended RNTP Threshold IE would signify the maximum transmission power in ABS subframes.

Misuse of signaling may be detected using RSRP by implementation. In other embodiments of inventive concepts, the RSRP Measurement List can be used to better determine the interference protection level and scheduling policies for eCoMP cluster coordination. Hence, the RSRP measurement list can be used in a receiving node to detect misuse of X2 signaling from the sending node (for instance, if the sending node requests unnecessary muting of too many resources in the receiving node by the CoMP hypothesis IE) leading to unfairness in the system and/or system instability.

Indeed, the RSRP Measurement List may provide measurements collected by UEs in cells associated to different eNBs. Hence, the way in which these measurements are determined may be consistent (i.e., it may follow precise rules stated by the standard) for all nodes involved in the eCoMP cluster. On the contrary, the way CoMP Hypothesis and Benefit Metric are determined may be node specific. For example, derivation of such parameters could be vendor or implementation specific. Therefore, the RSRP Measurement List can be used by the receiving node to detect signaling misuse, evaluate the real benefit, evaluate a need for interference protection, and/or evaluate a level of mitigation to be applied.

As an example of an RSRP embodiment, an eNB could indicate to a peer eNB or to a central coordinator a high benefit associated to a given CoMP Hypothesis. However, the RSRP Measurement List could reveal that the level of interference caused by cells served by the receiving eNB is relatively low (or at least lower than that indicated by the Benefit Metric that was received). Hence, the level of interference mitigation to be provided by the receiving node may be relatively low (e.g., a small transmission power reduction may be sufficient) because the major cause of interference may reside in emissions from a different node. Stated in other words, the receiving node may chose to provide a transmission power reduction that is less than that indicated by the received CoMP Hypothesis if the received RSRP Measurement List indicates a potential reduction in interference that is less than that indicated by the Benefit Metric.

In general, the RSRP Measurement List can be used to check that the evaluation made by the sending node in determining CoMP Hypothesis and Benefit Metric is correct, i.e. the receiving node may decide to give a higher or lower weight (and eventually to ignore) to the request for interference mitigation in resources indicated in CoMP Hypothesis and Benefit Metric by means of analyzing the RSRP measurements.

As an example of another RSRP embodiment, the RSRP Measurement List may be used as a tool to normalize different Benefit Metric IEs received from different eNodeBs (base stations). As discussed above, determining values for the Benefit Metric may be implementation and/or vendor specific. For example, two eNBs indicating the same or similar CoMP Hypothesis and Benefit Metric may in fact experience different levels of interference and be subject to different benefits in case interference mitigation takes place, or different eNBs subject to the same levels of interference may generate different CoMP Hypotheses and Benefit Metrics. These differences may be exposed by analyzing the RSRP Measurement List. Different nodes declaring similar or same CoMP Hypotheses and Benefit Metrics may send different RSRP Measurement Lists. Hence, RSRP Measurements from the different eNBs can thus be used to determine a baseline benefit value for the Benefit Metric and to normalize received benefit metrics using associated RSRP Measurement Lists.

Inventive concepts may be divided into embodiments covering distributed architectures and embodiments covering centralized architectures for inter eNB CoMP, also referred to as eCoMP herein.

Embodiments of distributed coordination implementation in distributed architectures will now be discussed with reference to the flow chart of FIG. 7.

A mesh network of peer nodes can be referred to as a distributed architecture. As an example, such nodes can be assumed to be eNBs. These are operations used for distributed coordination:

In a first, informative phase of the method at block 701, each eNB sends to other neighbor eNBs a CoMP Hypothesis, Benefit Metric and RSRP Measurements. This allows receiving eNBs to understand the interference protection desired by the sending eNB and the level of protection needed.

In a second, reactive phase of the method at block 703, each eNB sends an RNTP IE to other neighbor eNBs. The RNTP provides information about the resource allocation adopted by the sending eNB, i.e. the scheduling derived by the sending eNB from the exchange of information with other neighbor eNBs carried out in the first phase of the method.

Upon receiving RNTP IEs from neighbor nodes, a node can evaluate whether to modify its own scheduling policies for the sake of achieving a better coordination with other nodes. At block 705, each node can apply modifications to its own scheduling policy and communicate these via updates of the RNTP to neighbor nodes based on the RNTP received from neighboring nodes. For example, if all nodes in a neighborhood are using very low transmission power on one resource block, a node might decide to increase utilization of such resource block and reduce utilization of other resource blocks that are more heavily utilized in the neighborhood.

In an update phase of the method at block 707, eNBs can update the information previously exchanged with new instances of the signaling. For example, if RSRP measurements change or in general an eNB deems necessary to send new instances of such measurements, a new message can be sent to opportunely selected neighbors, including RSRP measurements. Similarly, if the eNB conditions (such as load demand, number of UEs served, UEs geometries, etc.) imply a change in the scheduling policy, a new RNTP IE can be signaled to neighbor eNBs. Further, if the interference condition of an eNB changes and it is derived that a new pattern of interference protected resources should be signaled to neighbor eNBs, a new message with an update of CoMP Hypothesis and Benefit Metric can be sent.

Combining in the same message one or more of the information above can be carried out by the eNB. General principles of this class of embodiments of distributed architecture are illustrated in the flow chart of FIG. 7.

In this embodiment, eNBs use a peer to peer interface such as the X2 interface to exchange information via a Class 2 procedure, namely a procedure made of a single message from sender to receiver and not requiring a response message. As an example the LOAD INFORMATION message can be considered as an example for this embodiment. Some embodiments include exchanging to following information via the Class 2 procedure:

CoMP Hypothesis IE: When used in distributed architectures (i.e. for peer to peer eNB signaling) this IE communicates to a node that there could be a hypothetical benefit (indicated by the Benefit Metric IE discussed below) for the UEs served by the sending eNB if DL interference is reduced on certain resources given by a hypothetical resource allocation identified/suggested in the CoMP Hypothesis IE.

Benefit Metric IE: This IE is an indication of hypothetical benefits that the sending node's UEs may gain if the receiving eNB adopts the resource allocation policy suggested in the CoMP Hypothesis IE.

List of RSRP measurements IE: The RSRP measurements may be used to infer the interference and channel conditions of UEs in need of interference-protected resources. Namely, RSRP measurements can be provided for UEs monitoring different cells such as serving and neighbor cells. The receiving eNB may use signal strengths of such monitored cells to provide an independent understanding of UE interference and channel conditions for the sending eNB.

RNTP IE: This IE is already defined in the specifications defining the X2 interface and is described as in 3GPP TS 36.423 V12.0.0, "X2 Application Protocol," December 2013: "This IE provides an indication on DL power restriction per PRB in a cell and other information needed by a neighbor eNB for interference aware scheduling"

In this embodiment, a signaling solution is shown as an example in FIG. 8 using an X2 based distribution solution for inter eNB CoMP.

In the example of FIG. 8, the following operations can be described:

Operation 0. eNBs belonging to an Inter eNB CoMP cluster are configured with information about neighboring eNBs in the same cluster.

Note: such configuration may be omitted if cluster members are inferred by presence of Inter eNB CoMP specific IEs in LOAD INFORMATION message Operation 1. For each eNB1 -eNB2 pair in an Inter eNB CoMP cluster, eNB1 sends an X2:LOAD INDICATION message (also referred to as a Load Information message) to eNB2 including CoMP Hypothesis IE, Benefit Metric IE and RSRP IE. The CoMP Hypothesis IE indicates the resources requested by eNB1 as DL interference protected. The Benefit Metric IE indicates the hypothetical benefit eNB1 would receive if such resources were interference protected. The RSRP Measurements List IE indicates the RSRP measurement on cells detected by UEs in need of interference protection: such measurements provide an indication of the power reduction to be performed by receiving eNB on the resources indicated in the CoMP Hypothesis IE and of the interference received by affected UEs.

Operation 2. Based on the information received in step 1, and for each eNB1-eNB2 pair in an eCoMP cluster, eNB2 sends an X2:LOAD INDICATION message to eNB1 with an RNTP IE indicating the resource allocation followed by eNB2. The RNTP Threshold IE may be chosen for eCoMP purposes (e.g. derived from RSRP Measurements List IE and Benefit Metric IE received)

Operation 3. If an eNB in an eCoMP cluster realizes that RSRP measurements of served UEs have changed and that an update of such measurements towards other eNBs in the cluster is opportune, a new X2:LOAD INDICATION message containing an update of the RSRP Measurements List IE is sent. Likewise, if an eNB in an eCoMP cluster realizes that changes to its scheduling policies need to be applied, e.g. due to better coordination with other neighboring eNBs or due to changing load demand, UE channel conditions and similar factors, a new RNTP IE can be sent in an X2: LOAD INFORMATION message to neighbor eNBs.

Operation 4. If an eNB in an eCoMP cluster realizes there is the need of changes to the resources indicated in the CoMP Hypothesis IE and eventually Benefit Metric IE, or to the resource allocation policy indicated by the RNTP IE, such changes can be signaled with new X2: LOAD INDICATION messages Operation 5. As an example, the following figure shows the changes to be made in the LOAD INFORMATION message.

As an example of how the IEs mentioned in the embodiment above can be added in the LOAD INFORMATION message, or in general in any new or existing message, FIGS. 9A and 9B illustrate an example of a tabular representation of such information.

As it can be seen, the RSRP measurements list may not be associated with a cell in the sending eNB, but it might simply state the RSRP value recorded for a cell defined by its E-CGI (Enhanced Global Cell Identity) and measured by a UE defined by a temporary UE identified, for example, in the form of the eNB-UE-X2AP-ID already defined in 3GPP TS 36.423 V12.0.0, "X2 Application Protocol," December 2013. The identifier could identify UEs that are either active or Idle at the moment of signaling. It is worth noting that by using an identifier such as the eNB-UE-X2AP-ID, which is only used to identify a UE over the X2 backhaul interface (and not to identify the UE over the air interface) it is possible to avoid "freezing" over the air identifiers for the purpose of X2 backhaul signaling. Indeed, over the air identifiers are used in much higher numbers and frequency and their shortage may imply issues with UE connection over the air interface.

Likewise, the CoMP Hypothesis IE and Benefit Metric IE may be identified as referring to a source cell, but they could also be provided in a serving cell independent way (i.e., they might indicate the resources in need of interference protection and the associated benefit for the whole eNB).

Another embodiment of encoding the IEs in an X2 Class 2 Load Information message is provided in FIGS. 10A and 10B. The difference in this example is that in case the Inter eNB Coordination Info IE is present the CoMP Hypothesis and Benefit Metric are both mandatory IEs. This is beneficial in cases where a Benefit Metric is always associated with a CoMP Hypothesis, in order to provide an estimate of benefit for the sending or the receiving node in case the resource allocation recommended with the CoMP Hypothesis and eventually detailed by information in the RNTP IE is followed.

Another detail of embodiments provided in FIGS. 10A and 10B is that the RSRP Measurement List is associated with a cell. Namely, this list constitutes measurements collected by UEs served by the cell identified by the Cell ID in the Cell Information Item IE. Each measurement is then associated with a cell ID, which includes the cell measured by the UE.

Embodiments on centralized coordination implementation will now be discussed.

In these embodiments, a centralized architecture is considered where a group of nodes, for example eNBs, is supported by a central node (e.g., a central eNB) that helps coordination of scheduling with the purpose of achieving interference mitigation for the UEs in need of interference protection served by nodes in the neighborhood.

In a first phase of the method, each node in the coordinated neighborhood signals to the central coordinator a CoMP Hypothesis, a Benefit Metric and RSRP measurements. Such information is meant to indicate to the centralized coordinator the protected resources and estimated benefit as desired by the sending eNB. Additionally, the RSRP measurements provide the centralized coordinator with an indication of the channel condition of the UEs in need of interference protection.

In a second phase of the method, the central coordinator provides each node in the neighborhood with a CoMP hypothesis indicating the resource allocation, i.e. scheduling, to follow in order to achieve a configuration providing interference mitigation benefits to all nodes in the neighborhood. The central coordinator may include in the message containing the CoMP Hypothesis an RNTP IE, where the only information to be considered by the receiving node is the RNTP threshold. Therefore, the signaling from the central coordinator will inform the receiving node about the set of resources to protect in terms of interference and a maximum transmission power for such set of resources.

In a third phase of the method, nodes involved in the procedure may signal to the central coordinator an RNTP IE indicating the scheduling policy adopted. Nodes can also signal the RNTP IE between each other, in order to directly inform neighboring nodes of the scheduling policy adopted and therefore allow better scheduling and resource allocation while maintaining interference mitigation.

As a consequence of receiving the RNTP IE, the central coordinator may decide to send to one or more eNBs a new RNTP IE indicating a modified RNTP threshold or it may decide to send a new CoMP Hypothesis, indicating a new set of resources in need of interference mitigation.

In a third phase of the method, eNBs can update the information previously sent to the central coordinator with new instances of the signaling. For example, if RSRP measurements change, or in general, if an eNB deems it useful/necessary to send new instances of such measurements, a new message can be sent to the central coordinator, including RSRP measurements. Similarly, if the eNB conditions (such as load demand, number of UEs served, UEs geometries, etc.) imply a change in the scheduling policy, a new RNTP can be signaled to the central coordinator and/or neighbor eNBs. Further, if the interference condition of an eNB changes and it is determined that a new pattern of interference protected resources should be signaled to the central coordinator, a new message with an update of CoMP Hypothesis and Benefit Metric can be sent. The central coordinator can react to such updates with a new indication of CoMP Hypothesis and RNTP threshold to opportunely selected nodes.

Combining in the same message one or more of the information elements identified above can be carried out by the eNBs and central coordinator.

The information elements signaled over X2 could/should be used for centralized coordination schemes and this information may now be interpreted as follows:

CoMP Hypothesis IE: When used in centralized architectures (i.e., for centrally coordinated scheduling) this IE communicates to the central coordinator that there could be a hypothetical benefit (indicated by the Benefit Metric IE discussed below) for the UEs served by the sending eNB if DL (DownLink) interference is reduced on certain resources given by an hypothetical resource allocation that is identified by the CoMP Hypothesis IE. If the IE is sent from the central coordinator to eNBs in an eCoMP cluster, this IE represents a resource allocation configuration, which might not necessarily need to be associated to a Benefit Metric IE.

Benefit Metric IE: This IE is an indication of hypothetical benefits that the sending node's UEs may gain if neighboring eNBs adopt the resource allocation policy suggested in the CoMP Hypothesis IE List of RSRP measurements IE: The RSRP measurements are used/needed to infer the interference and channel conditions of UEs in need of interference-protected resources. Namely, RSRP measurements can be provided for UEs monitoring different cells such as serving and neighbor cells. Comparing signal strengths of such monitored cells provides an understanding of the UE interference and channel conditions for UEs communicating with the sending eNB.

Figure 11:
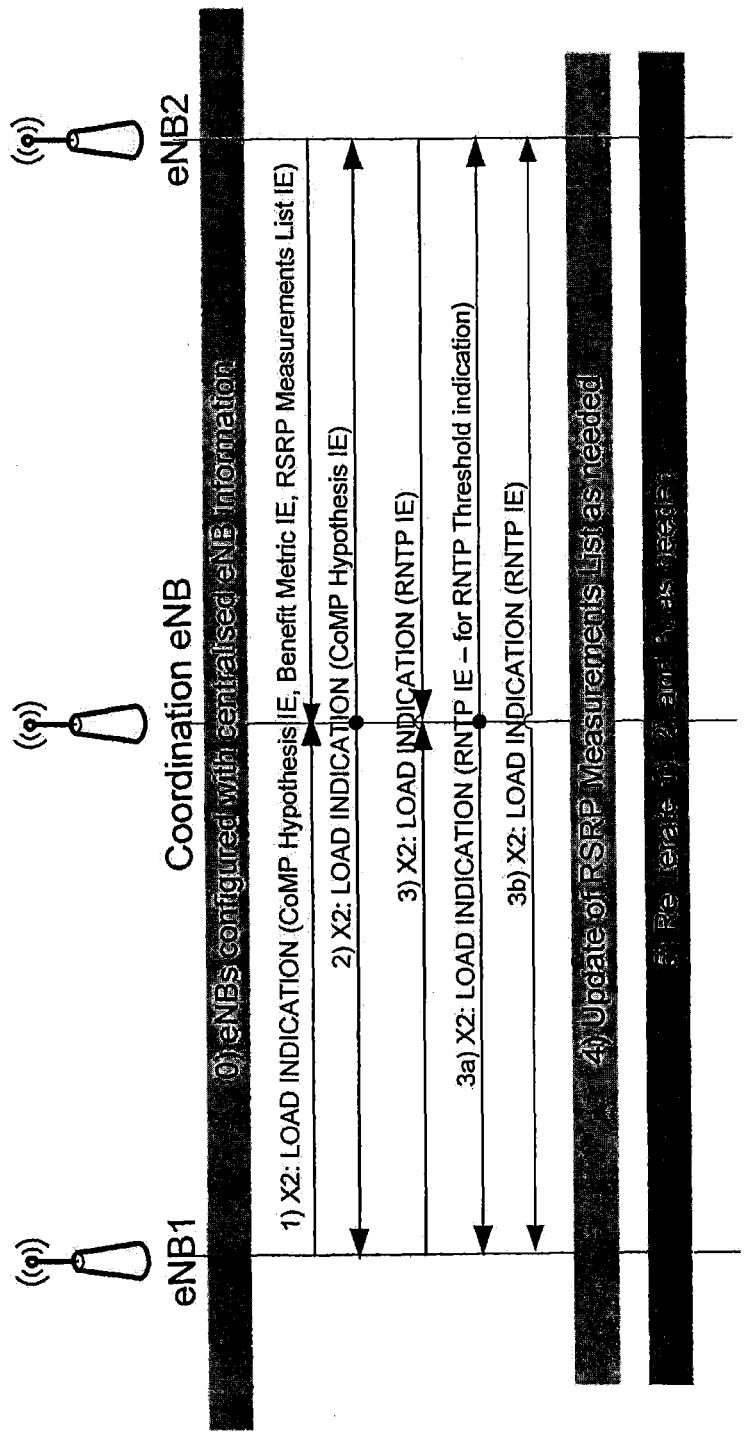
FIG. 11 is a message diagram illustrating examples of X2 based signaling in centralized architectures according to some embodiments of inventive concepts.

RNTP IE: This IE is already defined in the specifications defining the X2 interface and is described as in 3GPP TS 36.423 V12.0.0, "X2 Application Protocol," December 2013: "This IE provides an indication on DL power restriction per PRB in a cell and other information needed by a neighbor eNB for interference aware scheduling". When sent from a coordination node, this IE is used to adjust the RNTP Threshold IE used by the receiving eNB when adopting interference mitigation policies, namely to determine the maximum transmission power for the resources that should have reduced interference Assuming that one of the eNBs in FIG. 8 is a coordination eNB connected to other eNBs via the X2 interface, FIG. 11 shows how the X2 based signaling procedures proposed in this embodiment can adapt to such central coordination scheme. The following operations are involved in the example of FIG. 11:

Operation 0. eNBs belonging to an eCoMP cluster are configured with Coordination eNB information for the cluster.

Operation 1. eNB1 sends an X2:LOAD INDICATION message to Coordination eNB2 including CoMP Hypothesis IE, Benefit Metric IE and RSRP IE. The CoMP Hypothesis IE indicates the hypothetical resources eNB1 would like to be DL interference protected. The Benefit Metric IE indicates the hypothetical benefit eNB1 would receive if such resources were interference protected. The RSRP IE indicates the RSRP measurement on cells detected by UEs in need of interference protection: such optional measurements provide an indication of the interference received by affected UEs.

Operation 2. Coordination eNB sends an X2:LOAD INDICATION message to each eNB in the cluster, indicating the CoMP Hypothesis, possibly indicating the Benefit Metric and optionally indicating the RNTP Threshold IE in an RNTP IE for which only the RNTP Threshold IE should be considered, that each eNB should follow (i.e. the hypothetical resource allocation scheme to follow). Note that the Benefit Metric sent by the central coordinator to eNBs may consist of the benefit for the receiving eNB in following the suggested resource allocation policy indicated by CoMP Hypothesis and possibly RNTP Operation 3. In order to indicate and modify the hypothetical resource allocation scheme of eNBs in the eCoMP cluster the following is possible:

Operation 3a) eNBs send an X2:LOAD INFORMATION message with the RNTP IE to the Coordination eNB. This indicates the resource allocation followed by each eNB.

Operation 3b) The Coordination eNB may send to eNBs in the cluster an X2:LOAD INFORMATION message including an RNTP IE with the only purpose of updating the RNTP threshold used by the receiving eNB (i.e. the RNTP per PRB IE and other IEs except for RNTP Threshold IE shall be ignored).

Operation 3c) Each eNB in the cluster may send an X2:LOAD INDICATION message including the RNTP IE to peer eNBs in the cluster in order to allow for further scheduling improvement/optimization Operation 4. If an eNB in an eCoMP cluster realizes that RSRP measurements of served UEs have changed and that an update of such measurements towards the Coordination eNB or other eNBs in the cluster is opportune, a new X2:LOAD INDICATION message containing an update of the RSRP Measurements List IE is sent Operation 5. If an eNB in an eCoMP cluster realizes there is a use/need of change to the resources indicated in the CoMP Hypothesis IE and eventually Benefit Metric IE, such changes can be signaled to the Coordination eNB with a new X2: LOAD INDICATION message(s)

Figure 12:
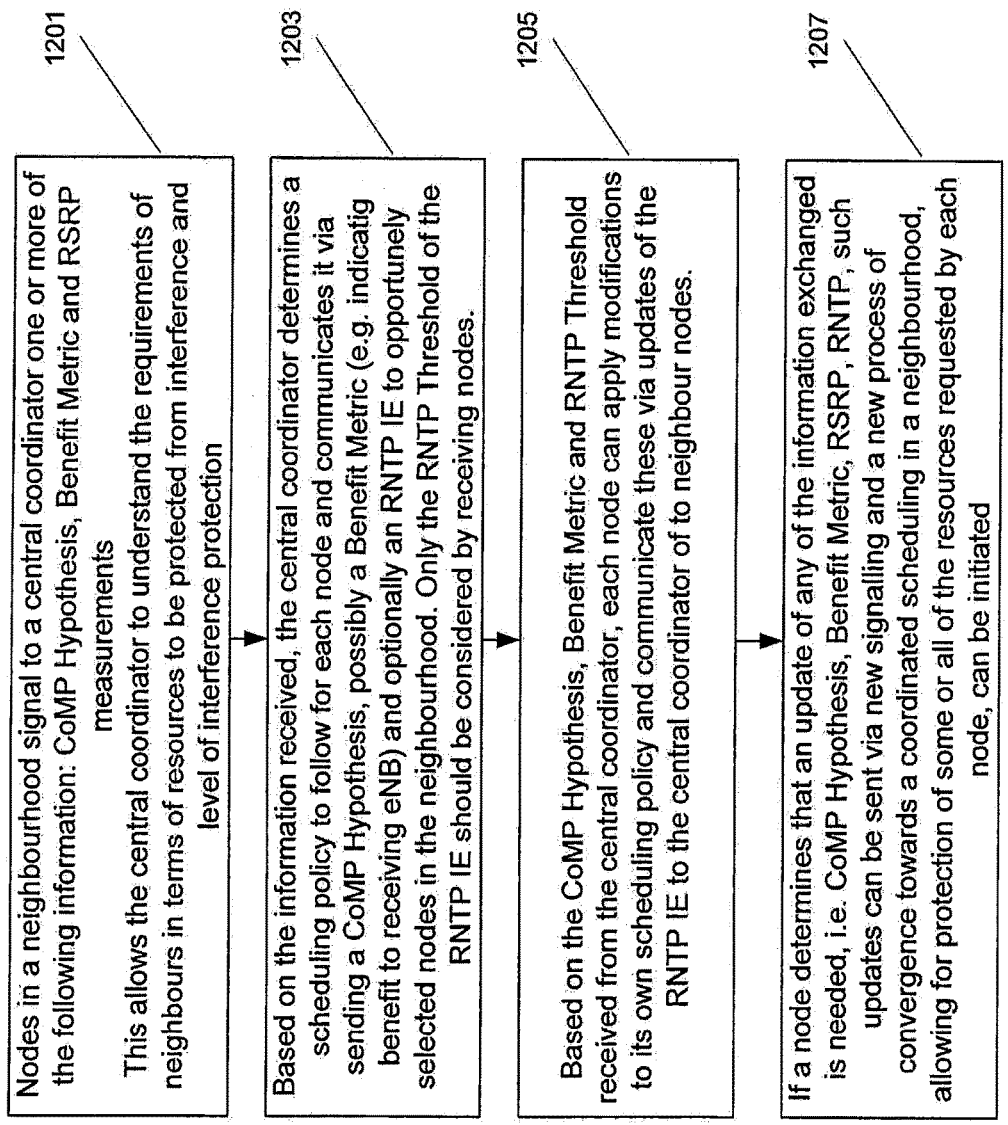
FIG. 12 is a flow chart illustrating operations covering centralized architectures according to some embodiments of inventive concepts.

General principles of this class of embodiments on centralized architecture are illustrated in the flow chart of FIG. 12.

Embodiments of combined distributed and centralized implementation will now be discussed.

Any combination of embodiments/methods/operations described above may/should be considered as possible. In a third embodiment, for example, nodes are first coordinated using a central coordination according to the second embodiments and thereafter, nodes exchange information directly between each other to fine tune interference coordination and keep track of parameter changes at neighbor nodes.

Figure 2:
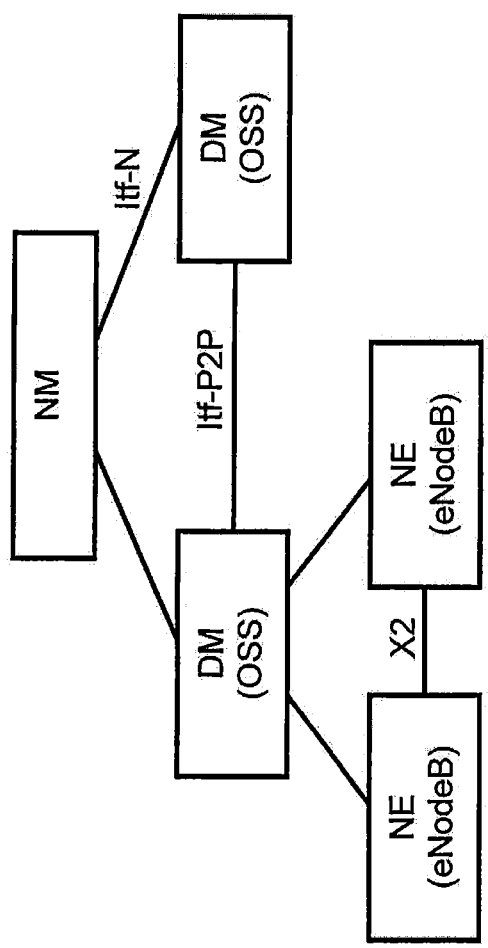
FIG. 2 is a block diagram illustrating a management system architecture an LTE system.
Figure 3:
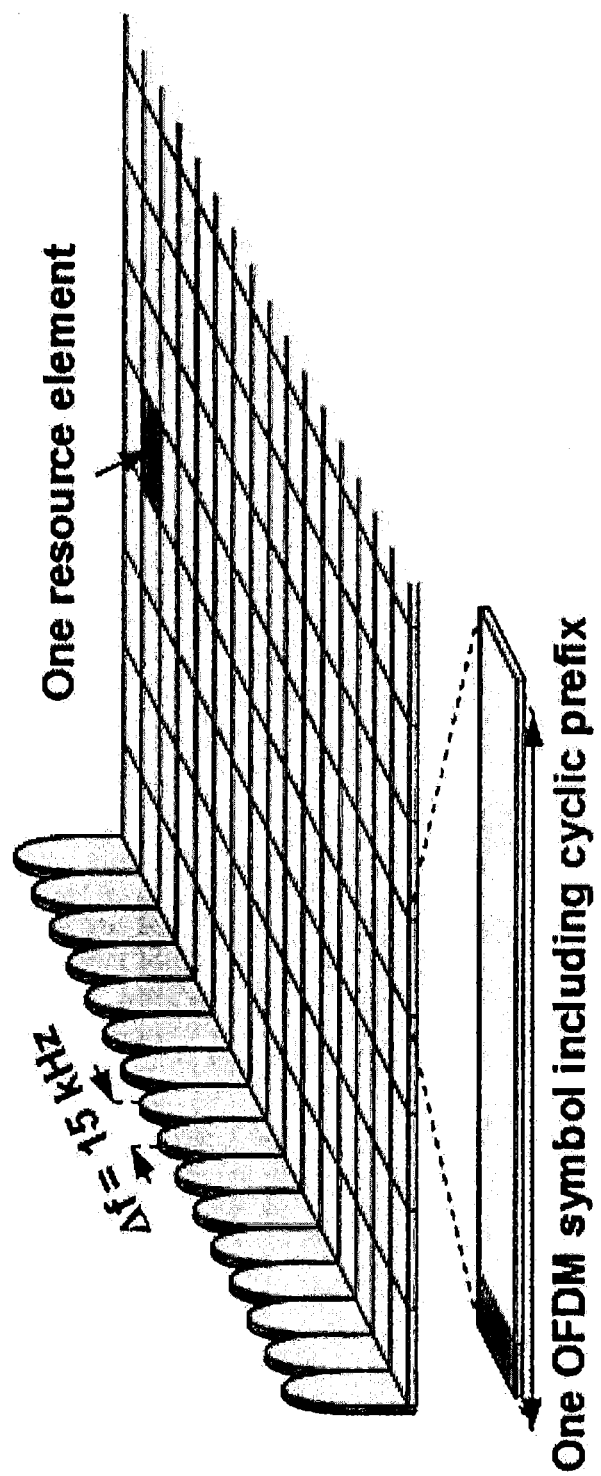
FIG. 3 is a diagram illustrating an LTE downlink physical resource.
Figure 4:
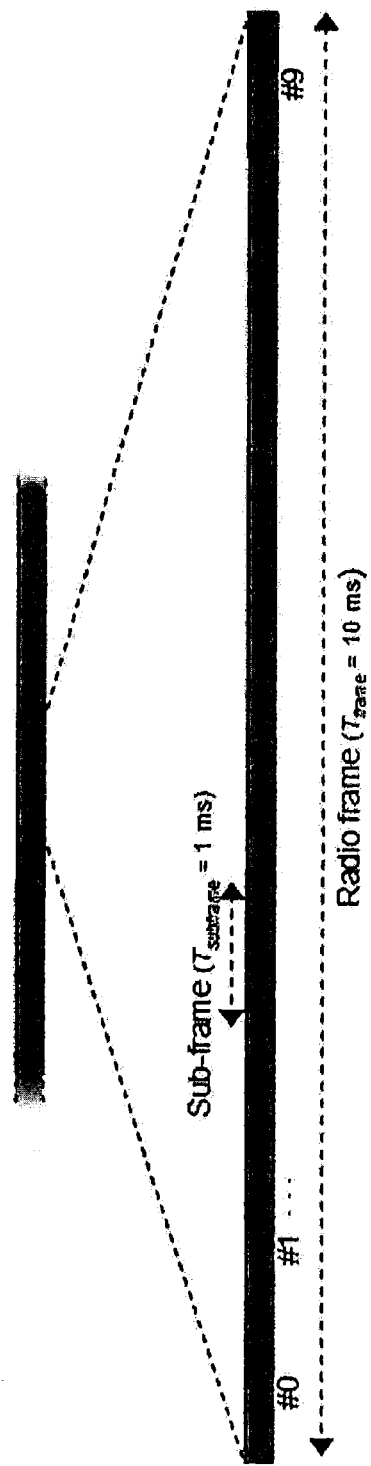
FIG. 4 is a diagram illustrating an LTE time-domain structure.
Figure 5:
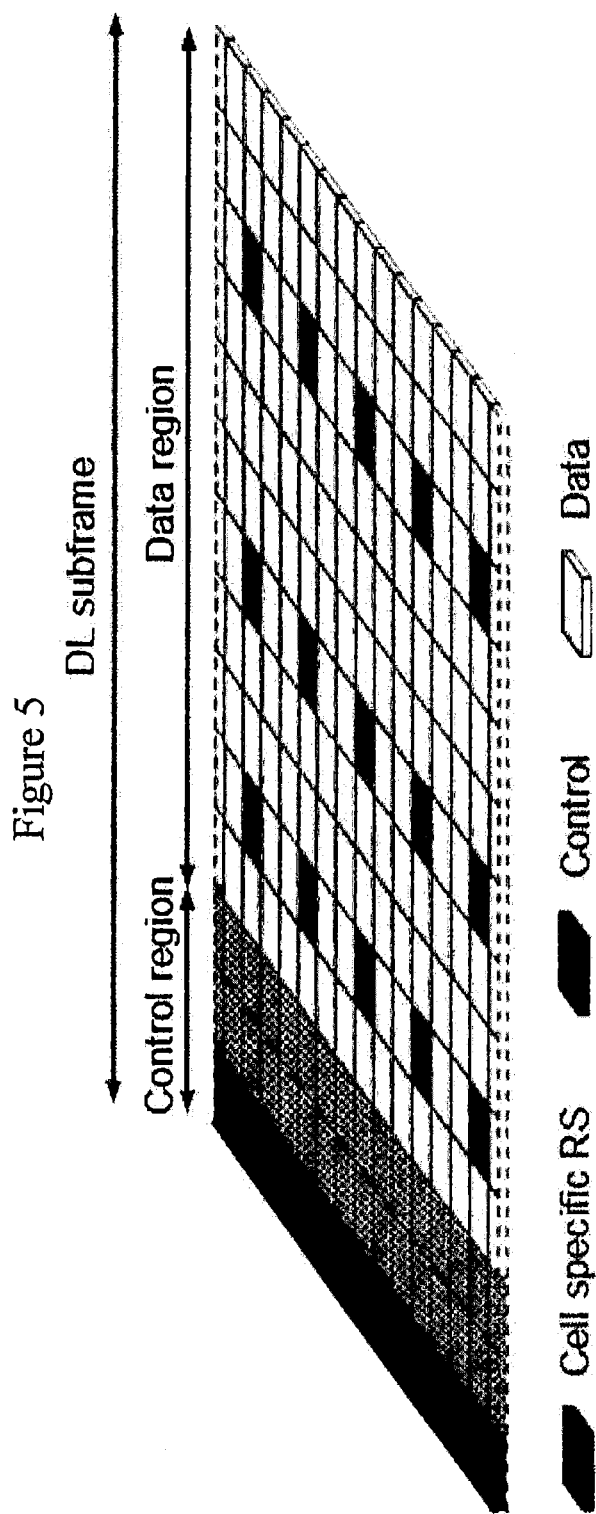
FIG. 5 is a diagram illustrating a mapping of PDCCH, PDSCH, and CRS within an LTE Downlink DL subframe.
Figure 6:
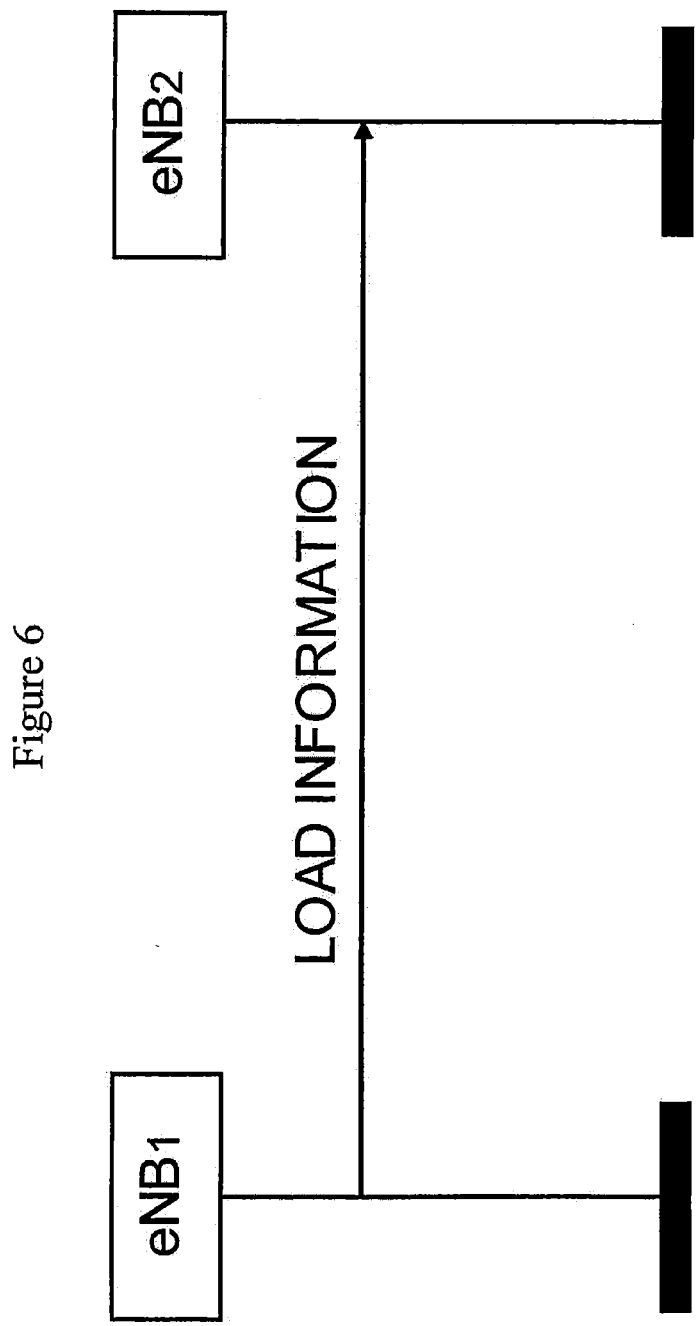
FIG. 6 is a messaging diagram illustrating an X2 load indication procedure.

In further embodiments of inventive concepts, the central coordinator for operations described in FIG. 12 may include/be an OAM (Operations And Management) system as per FIG. 2. Namely, the central coordinator may be represented either by a DM or by an NM. In such cases, signaling of information between RAN (Radio Access Network) nodes and central coordinator may occur via new or enhanced existing messages over the NE to DM interface and/or over the Itf-N interface.

The disclosures of all of the following references are hereby incorporated herein in their entireties by reference:

3GPP TS 36.423 V12.0.0, "X2 APPLICATION PROTOCOL," DECEMBER 2013;

3GPP TS 36.213 V11.3.0 "PHYSICAL LAYER PROCEDURES," JUNE 2013; and

R1-141816, LS ON INTER-ENB COMP FOR LTE, Mar. 31, 2014.

Figure 13:
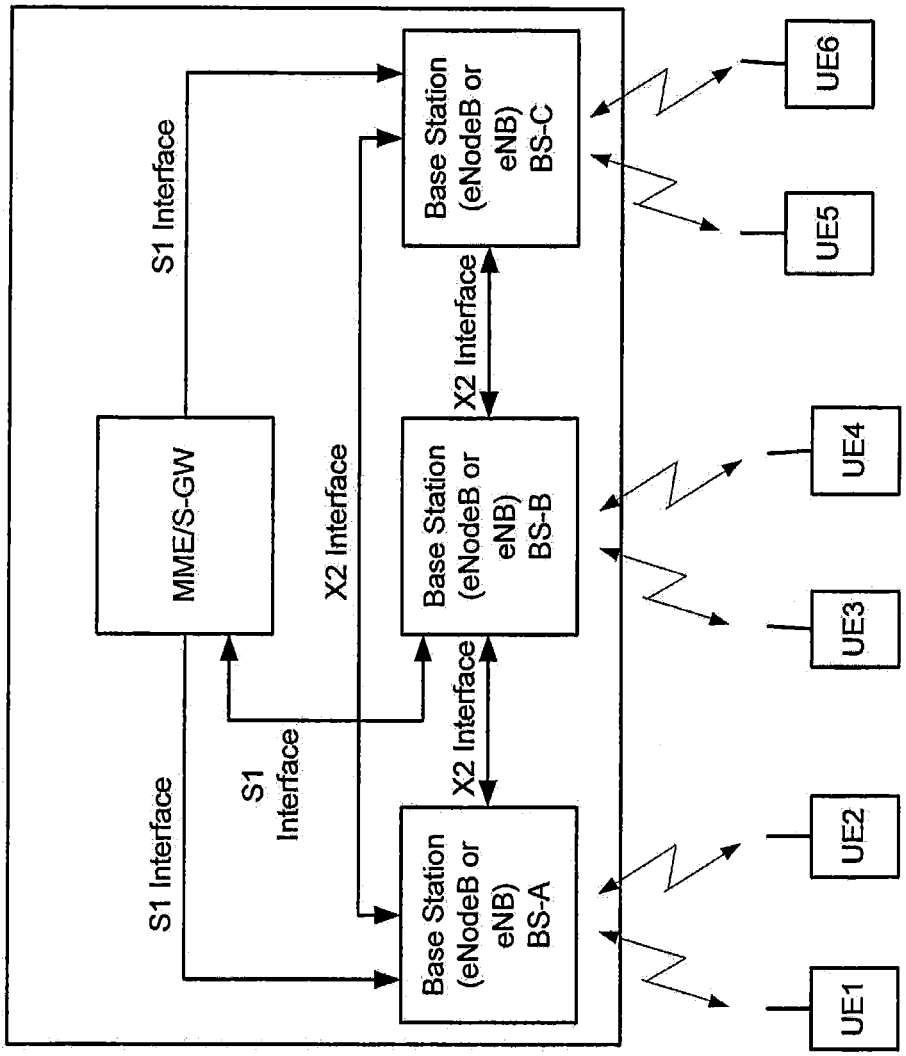
FIG. 13 is a block diagram illustrating a Radio Access Network according to some embodiments of inventive concepts.

FIG. 13 is a block diagram illustrating a Radio Access Network (RAN) according to some embodiments of present inventive concepts. As shown, communications between a plurality of base stations BS-A, BS-B, and BS-C may be provided using respective X2 Interfaces, and communications between base stations and one or more core nodes MME/S-GW may be provided using respective S1 interfaces. Each base station BS may communicate over a radio interface (including uplinks and downlinks) with respective wireless terminals UEs in a respective cell or cells supported by the base station. By way of example, base station BS-A is shown in communication with wireless terminals UE-1 and UE-2, base station BS-B is shown in communication with wireless terminals UE-3 and UE-4, and base station BS-C is shown in communication with wireless terminals UE-5 and UE-6. In embodiments supporting distributed schemes/architectures, each of base stations BS-A, BS-B, and BS-C may be respective peer nodes with respect to distributed scheduling disclosed herein. In embodiments supporting centralized schemes/architectures, one of the base stations (e.g., base station 13S-B may serve as a central coordinator node with respect to centralized scheduling disclosed herein.

Figure 14:
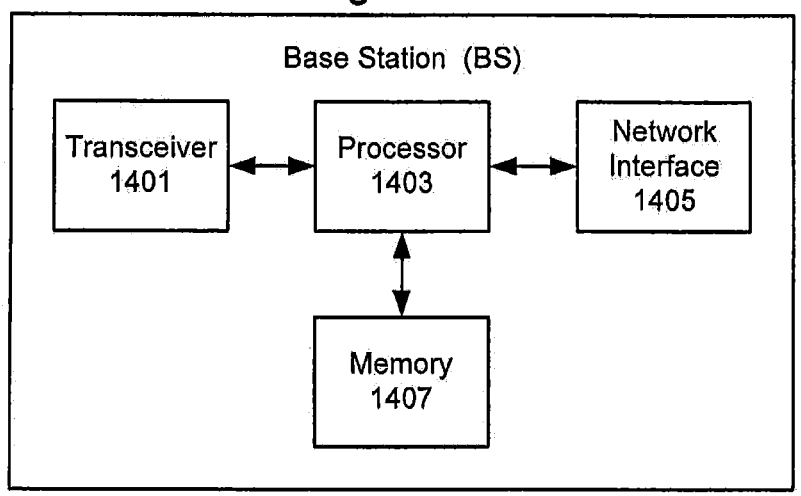
FIG. 14 is a block diagram illustrating elements of a base station according to some embodiments of inventive concepts.

FIG. 14 is a block diagram illustrating elements of a base station BS of FIG. 16. As shown, a base station BS may include a transceiver 1401 configured to provide radio communications with a plurality of wireless terminals, a network interface 1405 configured to provide communications with other base stations of the RAN, and a processor 1403 coupled to the transceiver and the network interface, and a memory (1407) coupled to the processor. The memory 1407 may include computer readable program code that when executed by the processor 1403 causes the processor to perform operations according to embodiments disclosed herein. According to other embodiments, processor 1403 may be defined to include memory so that a memory is not separately provided.

Base station operations according to some embodiments of inventive concepts will be discussed below with reference to the flow charts of FIGS. 15, 16, 17, and 18.

Operations of processor 1403 of a first base station BS-A are discussed below with respect to the flow chart of FIG. 15 according to some embodiments of inventive concepts. At block 1521, processor 1403 of base station BS-A may receive RSRP measurements from wireless terminals UE-1 and UE-2 (through transceiver 1401), and at block 1523, processor 1403 may transmit a Reference Signal Received Power (RSRP) measurement list, a Coordinated Multipoint (CoMP) hypothesis, and a Benefit Metric through network interface 1405 to a second base station BS-B (e.g., as elements of a Load Information message over an X2 interface). More particularly, the RSRP measurement list may be based on the RSRP measurements received from the wireless terminals UE-1 and UE-2.

The CoMP hypothesis may identify downlink resources for interference protection. More particularly, the CoMP hypothesis may define a hypothetical resource allocation, and the Benefit Metric may define a benefit to the first base station BS-A associated with the hypothetical resource allocation defined by the CoMP hypothesis. Moreover, the hypothetical resource allocation of the CoMP hypothesis may be associated with the second base station BS-B.

In addition, processor 1403 may receive a Relative Narrowband Transmission Power (RNTP) Information Element (IE) through network interface 1405 at block 1531. The RNTP IE may include a RNTP per physical resource block (PRB) and a RNTP threshold, with the RNTP threshold indicating a downlink transmission power threshold for the second base station BS-B and with the RNTP per PRB indicating on a physical resource block basis for the second base station BS-B physical resource blocks for which downlink transmission is below the downlink transmission power indicated by the second RNTP threshold and/or physical resource blocks for which downlink transmission is above the downlink transmission power indicated by the second RNTP threshold. At block 1535, processor 1403 may set a scheduling policy for downlink transmissions from the first base station BS-A based on consideration of the RNTP per PRB and the RNTP threshold.

Operations of base station BS processor 1403 according to some embodiments of inventive concepts are discussed below with respect to the flow chart of FIG. 16. Operations of blocks 1521 and 1523 may be the same as discussed above with respect to FIG. 15. At block 1631, processor 1403 may receive a second CoMP hypothesis from the second base station BS-B through network interface 1405, with the second CoMP hypothesis defining a resource allocation for downlink transmissions from the first base station BS-A.

At block 1633, processor 1403 may receive a Relative Narrowband Transmission Power (RNTP) Information Element (IE), with the RNTP IE including a dummy value in a RNTP per physical resource block (PRB) and a RNTP threshold. The dummy value may identify the RNTP threshold as defining a maximum power for interference protected resources identified by the second CoMP hypothesis for downlink transmission from the first base station BS-A. At block 1635, processor 1403 may schedule downlink transmissions from the first base station BS-A in accordance with the second CoMP hypothesis.

At block 1637, processor 1403 may transmit a second RNTP TB including a second RNTP per physical resource block PRB and a second RNTP threshold. The second RNTP threshold may indicate a downlink transmission power threshold for the first base station BS-A and the second RNTP per PRB may indicate on a physical resource block basis for the first base station BS-A physical resource blocks for which downlink transmission is below the downlink transmission power indicated by the second RNTP threshold and/or physical resource blocks for which downlink transmission is above the downlink transmission power indicated by the second RNTP threshold.

Figure 17:
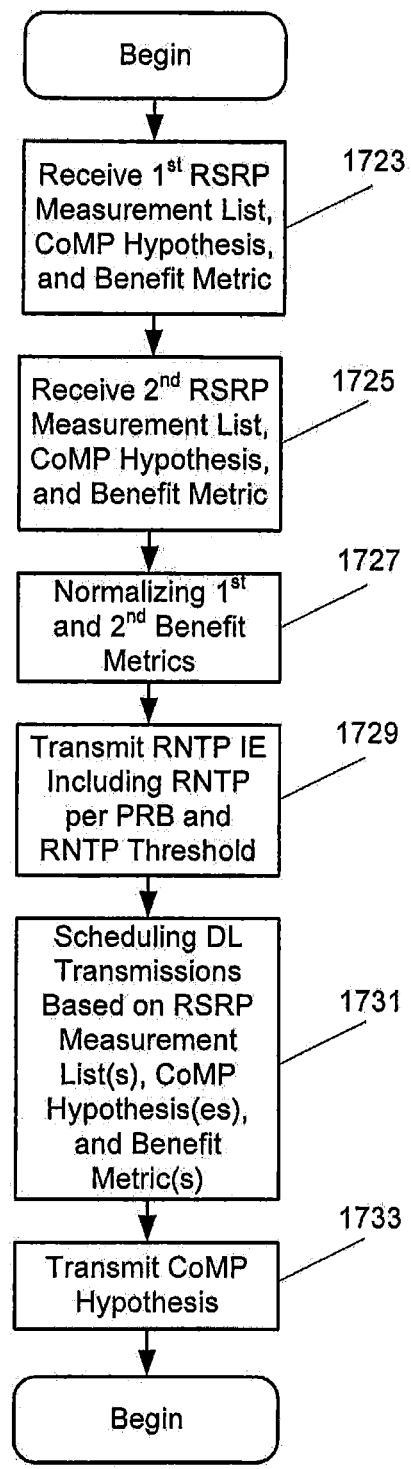

Operations of base station BS processor 1403 according to some embodiments of inventive concepts are discussed below with respect to the flow chart of FIG. 17. At block 1723, processor 1403 of first base station BS-A may receive a Reference Signal Received Power (RSRP) measurement list, a Coordinated Multipoint (CoMP) hypothesis, and a Benefit Metric from second base station BS-B through network interface 1405 (e.g., as elements of a Load Information message over an X2 interface). For example, the CoMP hypothesis may define a hypothetical resource allocation associated with the first base station BS-A, and the Benefit Metric may define a benefit to the second base station BS-B associated with the hypothetical resource allocation defined by the CoMP hypothesis. Moreover, the RSRP measurement list may be based on RSRP measurements transmitted by wireless terminals UE-3 and UE-4 to the second base station BS-B, and the CoMP hypothesis may identify downlink resources for interference protection.

The RSRP measurement list of block 1723 may be a first RSRP measurement list, the CoMP hypothesis of block 1723 may be a first CoMP hypothesis, and the Benefit Metric of block 1723 may be a first Benefit Metric. At block 1725, processor 1403 may receive a second RSRP measurement list, a second CoMP hypothesis, and a second Benefit Metric from a third base station BS-C through network interface 1405, and at block 1727, processor 1403 may normalize the first and second Benefit Metrics based on the first and second RSRP measurement lists to determine normalized first and second Benefit Metrics.

At bock 1729, processor 1403 may transmit a Relative Narrowband Transmission Power (RNTP) Information Element (IE) including a RNTP per physical resource block (PRB) and a RNTP threshold. The RNTP threshold may indicate a downlink transmission power threshold for the first base station BS-B and the RNTP per PRB may indicate on a physical resource block basis for the first base station BS-A physical resource blocks for which downlink transmission is below the downlink transmission power indicated by the second RNTP threshold and/or physical resource blocks for which downlink transmission is above the downlink transmission power indicated by the second RNTP threshold.

At block 1731, processor 1403 may schedule downlink transmissions of the first base station BS-A based on the first and second RSRP measurement lists, the first and second CoMP hypotheses, and the normalized first and second Benefit Metrics. For example, scheduling may include evaluating a benefit to the second base station BS-B based on the RSRP measurement list and the Benefit Metric.

Moreover, the CoMP hypothesis of block 1723 may be a first CoMP hypothesis, and at block 1733, processor 1403 may transmit a second CoMP hypothesis to the second base station BS-B, with the second CoMP hypothesis defining a resource allocation for downlink transmissions from the second base station BS-A.

Figure 18:
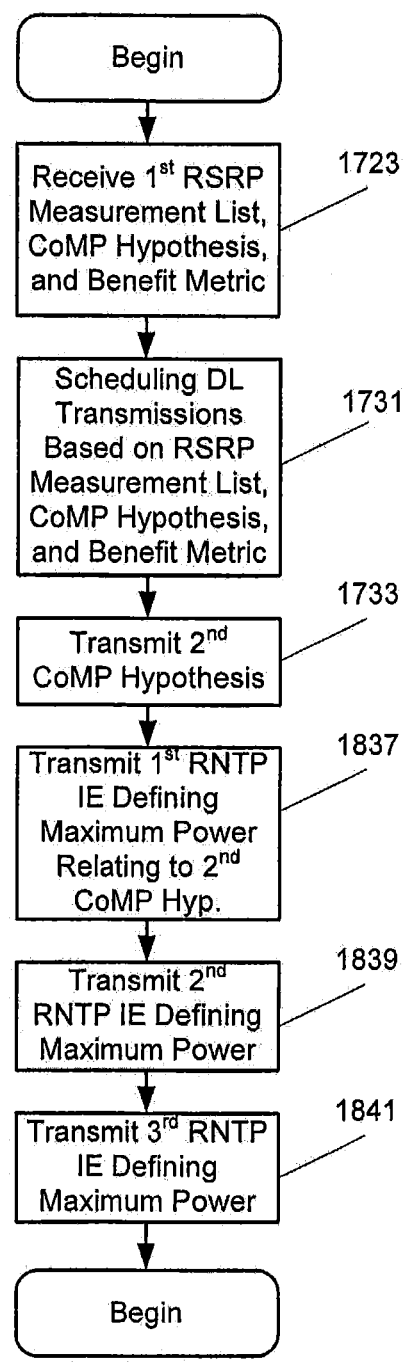

Operations of base station BS processor 1403 according to some embodiments of inventive concepts are discussed below with respect to the flow chart of FIG. 18. At block 1723, processor 1403 of first base station BS-A may receive a first Reference Signal Received Power (RSRP) measurement list, a first Coordinated Multipoint (CoMP) hypothesis, and a first Benefit Metric through network interface 1405 from a second base station BS-B (e.g., as elements of a Load Information message over an X2 interface). Moreover, the CoMP hypothesis may identify downlink resources for interference protection. At block 1731, processor may schedule downlink transmissions based on the RSRP measurement list, the CoMP hypothesis, and the Benefit Metric.

At block 1733, processor 1403 may transmit a second CoMP hypothesis through network interface 1405 to the second base station BS-B, with the second CoMP hypothesis defining a resource allocation for downlink transmissions from the second base station BS-A.

At block 1837, processor 1403 may transmit a first Relative Narrowband Transmission Power (RNTP) Information Element (IE) through network interface 1405. The first RNTP IE may include a dummy value in a RNTP per physical resource block (PRB) and a RNTP threshold, and the dummy value may identify the RNTP threshold as defining a maximum power for interference protected resources identified by the second CoMP hypothesis for downlink transmission from the second base station BS-B.

At block 1839, processor 1403 may transmit a second RNTP IE including a second RNTP per physical resource block (PRB) and a second RNTP threshold. The second RNTP threshold may indicate a downlink transmission power threshold for the first base station BS-A and the second RNTP per PRB may indicate on a physical resource block basis for the first base station BS-A physical resource blocks for which downlink transmission is below the downlink transmission power indicated by the second RNTP threshold and/or physical resource blocks for which downlink transmission is above the downlink transmission power indicated by the second RNTP threshold.

At block 1841, processor 1403 may transmit a third CoMP hypothesis to third base station BS-C, and the third CoMP hypothesis may define a resource allocation for downlink transmissions from the third base station BS-C.

In example embodiments discussed below, a first base station may refer to base station BS-A or BS-B depending on the context of the embodiment. In Embodiments 1-13, for example, the first base station refers to base station BS-A transmitting a RNTP ID. In Embodiments 14-28, a first base station refers to base station BS-B receiving a RNTP IE. In Embodiments 29-40, a first base station refers to base station BS-A transmitting an RSRP measurement list. In Embodiments 41-57, a first base station refers to base station BS-B receiving a RSRP measurement list.

Example Embodiments:

Embodiment 1. A method of operating a first base station (BS-B) in a radio access network (RAN), the method comprising: transmitting a Relative Narrowband Transmission Power (RNTP) Information Element (IE), wherein the RNTP IE includes a RNTP per physical resource block (PRB) and a RNTP threshold, wherein the RNTP per FRB has a dummy value that identifies the RNTP threshold as a recommendation for a power threshold to be used by a second base station (BS-A) for downlink transmission from the second base station (BS-A).

Embodiment 2. The method of Embodiment 1 wherein the dummy value of the RNTP per PRB identifies the RNTP threshold as a recommendation for a maximum power level to be used by the second base station (BS-A) for downlink transmissions for resources that are considered to be used in a hypothetical resource allocation.

Embodiment 3. The method of Embodiment 1 wherein the dummy value of the RNTP per PRB identifies the RNTP threshold as a recommendation for a maximum power level to be used by the second base station (BS-A) for downlink transmissions for resources that are considered to be unused in a hypothetical resource allocation.

Embodiment 4. The method of Embodiment 1 wherein the dummy value of the RNTP per PRB identifies the RNTP threshold as a recommendation for a maximum power level to be used by the second base station (BS-A) for downlink transmissions for interference protected resources.

Embodiment 5. The method of Embodiment 1 wherein the dummy value of the RNTP per PRB identifies the RNTP threshold as a recommendation for a maximum power level to be used by the second base station (BS-A) for downlink transmissions for Almost Blank Subframes (ABS).

Embodiment 6. The method of any of Embodiments 1-5 wherein the RNTP IE is a first RNTP IE, the RNTP per PRB is a first RNTP per PRB, and the RNTP threshold is a first RNTP threshold, the method further comprising: transmitting a second RNTP IE including a second RNTP per PRB and a second RNTP threshold, wherein the second RNTP threshold indicates a downlink transmission power threshold for the first base station (BS-B) and the second RNTP per PRB indicates on a physical resource block basis for the first base station (BS-B) physical resource blocks for which downlink transmission is below the downlink transmission power threshold indicated by the second RNTP threshold and/or physical resource blocks for which downlink transmission is above the downlink transmission power threshold indicated by the second RNTP threshold.

Embodiment 7. The method of Embodiment 6 wherein the first and second RNTP IEs are transmitted to the second base station (BS-A).

Embodiment 8. The method of Embodiment 6 wherein the first and second RNTP IEs are transmitted to a coordinating node different than the second base station (BS-A).

Embodiment 9. The method of any of Embodiments 1-6 wherein the RNTP IE is transmitted to the second base station (BS-A).

Embodiment 10. The method of any of Embodiments 1-6 wherein the RNTP IE is transmitted to a coordinating node different than the second base station (BS-A).

Embodiment 11. The method of any of Embodiments 1-5 or 9-10 wherein the RNTP IE is a first RNTP IE, the RNTP per PRB is a first RNTP per PRB, and the RNTP threshold is a first RNTP threshold, the method further comprising: receiving a second RNTP IE including a second RNTP per PRB and a second RNTP threshold from the second base station (BS-A), wherein the second RNTP threshold indicates a downlink transmission power threshold for the second base station (BS-A) and the second RNTP per PRB indicates on a physical resource block basis for the second base station (BS-A) physical resource blocks for which downlink transmission is below the downlink transmission power indicated by the second RNTP threshold and/or physical resource blocks for which downlink transmission is above the downlink transmission power indicated by the second RNTP threshold.

Embodiment 12. The method of any of Embodiments 1-11 wherein transmitting the RNTP IE comprises transmitting the RNTP IE over an X2 interface.

Embodiment 13. The method of any of Embodiments 1-12 wherein one of a set of RNTP per PRB values is assigned to a RNTP per PRB, wherein each of a subset of the set of RNTP per PRB values defines respective resource blocks on a physical resource block basis for which downlink transmission is below a downlink transmission power threshold and/or physical resource blocks for which downlink transmission power is above a downlink transmission power threshold, and wherein the dummy value is included in the set of values and excluded from the subset.

Embodiment 14. A method of operating a base station (BS-A) in a radio access network (RAN) including a plurality of base stations, the method comprising: receiving a Relative Narrowband Transmission Power (RNTP) Information Element (IE), wherein the RNTP IE includes a dummy value in a RNTP per physical resource block (PRB) and a RNTP threshold, wherein the dummy value identifies the RNTP threshold as a recommendation for a power threshold to be used by the base station (BS-A) for downlink transmission from the base station (BS-A).

Embodiment 15. The method of Embodiment 14 wherein the dummy value of the RNTP per PRB identifies the RNTP threshold as a recommendation for a maximum power level to be used by the base station (BS-A) for downlink transmissions for resources that are considered to be used in a hypothetical resource allocation.

Embodiment 16. The method of Embodiment 14 wherein the dummy value of the RNTP per PRB identifies the RNTP threshold as a recommendation for a maximum power level to be used by the base station (BS-A) for downlink transmissions for resources that are considered to be unused in a hypothetical resource allocation.

Embodiment 17. The method of Embodiment 14 wherein the dummy value of the RNTP per PRB identifies the RNTP threshold as a recommendation for a maximum power level to be used by the base station (BS-A) for downlink transmissions for interference protected resources.

Embodiment 18. The method of Embodiment 14 wherein the dummy value of the RNTP per PRB identifies the RNTP threshold as a recommendation for a maximum power level to be used by the base station (BS-A) for downlink transmissions for Almost Blank Subframes (ABS).

Embodiment 19. The method of any of Embodiments 14-18 wherein the base station (BS-A) is a first base station (BS-A), the RNTP IE is a first RNTP IE, the RNTP per PRB is a first RNTP per PRB, and the RNTP threshold is a first RNTP threshold, the method further comprising: receiving a second RNTP IE including a second RNTP per PRB and a second RNTP threshold, wherein the second RNTP threshold indicates a downlink transmission power threshold for a second base station (BS-C) and the second RNTP per PRB indicates on a physical resource block basis for the second base station (BS-C) physical resource blocks for which downlink transmission is below the downlink transmission power indicated by the second RNTP threshold and/or physical resource blocks for which downlink transmission is above the downlink transmission power indicated by the second RNTP threshold.

Embodiment 20. The method of Embodiment 19 wherein the first and second RNTP IEs are received from the second base station (BS-C).

Embodiment 21. The method of Embodiment 19 wherein the first and second RNTP IEs are received from a third base station (BS-B) different than the first and second base stations.

Embodiment 22. The method of any of Embodiments 14-18 wherein the RNTP IE is received from the second base station (BS-C).

Embodiment 23. The method of any of Embodiments 14-18 wherein the RNTP IE is received from a third base station (BS-B) different than the first and second base stations.

Embodiment 24. The method of any of Embodiments 14-18 or 22-23 wherein the RNTP IE is a first RNTP IE, the RNTP per PRB is a first RNTP per PRB, and the RNTP threshold is a first RNTP threshold, the method further comprising: transmitting a second RNTP IE including a second RNTP per PRB and a second RNTP threshold from the first base station (BS-A), wherein the second RNTP threshold indicates a downlink transmission power threshold for the first base station (BS-A) and the second RNTP per PRB indicates on a physical resource block basis for the first base station (BS-A) physical resource blocks for which downlink transmission is below the downlink transmission power indicated by the second RNTP threshold and/or physical resource blocks for which downlink transmission is above the downlink transmission power indicated by the second RNTP threshold.

Embodiment 25. The method of Embodiment 24 further comprising; before transmitting the second RNTP IE, selecting the second RNTP threshold based on consideration of the first RNTP threshold.

Embodiment 26. The method of any of Embodiments 14-25 further comprising: setting a scheduling policy for downlink transmissions from the first base station based on consideration of the RNTP threshold.

Embodiment 27. The method of any of Embodiments 14-26 wherein receiving the RNTP IE comprises receiving the RNTP IE over an X2 interface.

Embodiment 28. The method of any of Embodiments 14-27 wherein one of a set of RNTP per PRB values is assigned to a RNTP per PRB, wherein each of a subset of the set of RNTP per PRB values defines respective resource blocks on a physical resource block basis for which downlink transmission is below a downlink transmission power threshold and/or physical resource blocks for which downlink transmission power is above a downlink transmission power threshold, and wherein the dummy value is included in the set of values and excluded from the subset.

Embodiment 29. A method of operating a first base station (BS-A) in a Radio Access Network (RAN) including the first base station (BS-A) and a second base station (BS-B), the method comprising: transmitting a Reference Signal Received Power (RSRP) measurement list, a Coordinated Multipoint (CoMP) hypothesis, and a Benefit Metric to the second base station (BS-B).

Embodiment 30. The method of Embodiment 29 further comprising: receiving RSRP measurements from wireless terminals (UE-1, UE-2) at the first base station (BS-A), wherein the RSRP measurement list is based on the RSRP measurements received from the wireless terminals (UE-1, UE-2).

Embodiment 31. The method of any of Embodiments 29-30 wherein the CoMP hypothesis defines a hypothetical resource allocation, and wherein the Benefit Metric defines a benefit to the first base station (UE-A) associated with the hypothetical resource allocation defined by the CoMP hypothesis.

Embodiment 32. The method of Embodiment 31 wherein the hypothetical resource allocation of the CoMP hypothesis is associated with the second base station (BS-B).

Embodiment 33. The method of any of Embodiments 29-32 further comprising: receiving a Relative Narrowband Transmission Power (RNTP) Information Element (IE) including a RNTP per physical resource block (PRB) and a RNTP threshold, wherein the RNTP threshold indicates a downlink transmission power threshold for the second base station (BS-B) and the RNTP per PRB indicates on a physical resource block basis for the second base station (BS-B) physical resource blocks for which downlink transmission is below the downlink transmission power indicated by the second RNTP threshold and/or physical resource blocks for which downlink transmission is above the downlink transmission power indicated by the second RNTP threshold.

Embodiment 34. The method of Embodiment 33 further comprising: setting a scheduling policy for downlink transmissions from the first base station (BS-A) based on consideration of the RNTP per PRB and the RNTP threshold.

Embodiment 35. The method of any of Embodiments 29-34 wherein transmitting the RSRP measurement list, the CoMP hypothesis, and the Benefit Metric comprises transmitting the RSRP measurement list, the CoMP hypothesis, and the Benefit Metric to the second base station (BS-B) over an X2 Interface.

Embodiment 36. The method of any of Embodiments 29-34 wherein transmitting the RSRP measurement list, the CoMP hypothesis, and the Benefit Metric comprises transmitting the RSRP measurement list, the CoMP hypothesis, and the Benefit Metric to the second base station (BS-B) as elements of a Load Information message.

Embodiment 37. The method of any of Embodiments 29-36 wherein the CoMP hypothesis identifies downlink resources for interference protection.

Embodiment 38. The method of any of Embodiments 29-32 and 34-37 wherein the CoMP hypothesis comprises a first CoMP hypothesis, the method further comprising: receiving a second CoMP hypothesis from the second base station (BS-B), wherein the second CoMP hypothesis defines a resource allocation for downlink transmissions from the first base station (BS-A); and scheduling downlink transmissions from the first base station (BS-A) in accordance with the second CoMP hypothesis.

Embodiment 39. The method of Embodiment 38 further comprising: receiving a Relative Narrowband Transmission Power (RNTP) Information Element (IE), wherein the RNTP IE includes a dummy value in a RNTP per physical resource block (PRB) and a RNTP threshold, wherein the dummy value identifies the RNTP threshold as defining a maximum power for interference protected resources identified by the second CoMP hypothesis for downlink transmission from the first base station (BS-A).

Embodiment 40. The method of any of Embodiments 38-39 wherein the RNTP IE is a first RNTP IE, the method further comprising: transmitting a second RNTP IE including a second RNTP per physical resource block (PRB) and a second RNTP threshold, wherein the second RNTP threshold indicates a downlink transmission power threshold for the first base station (BS-A) and the second RNTP per PRB indicates on a physical resource block basis for the first base station (BS-A) physical resource blocks for which downlink transmission is below the downlink transmission power indicated by the second RNTP threshold and/or physical resource blocks for which downlink transmission is above the downlink transmission power indicated by the second RNTP threshold.

Embodiment 41. A method of operating a first base station (BS-B) in a Radio Access Network (RAN) including the first base station (BS-B) and a second base station (BS-A), the method comprising: receiving a Reference Signal Received Power (RSRP) measurement list, a Coordinated Multipoint (CoMP) hypothesis, and a Benefit Metric from the second base station (BS-A).

Embodiment 42. The method of Embodiment 41 wherein the RSRP measurement list is based on RSRP measurements transmitted by wireless terminals (UE-1, UE-2) to the second base station (BS-A).

Embodiment 43. The method of any of Embodiments 41-42 wherein the CoMP hypothesis defines a hypothetical resource allocation, and wherein the Benefit Metric defines a benefit to the second base station (BS-A) associated with the hypothetical resource allocation defined by the CoMP hypothesis.

Embodiment 44. The method of Embodiment 43 wherein the hypothetical resource allocation defined by the CoMP hypothesis is associated with the first base station (BS-B).

Embodiment 45. The method of any of Embodiments 41-44 further comprising: scheduling downlink transmissions based on the RSRP measurement list, the CoMP hypothesis, and the Benefit Metric.

Embodiment 46. The method of Embodiment 45 wherein scheduling comprises evaluating a real benefit to the second base station (BS-A) based on the RSRP measurement list and the Benefit Metric.

Embodiment 47. The method of any of Embodiments 41-46 wherein the RSRP measurement list is a first RSRP measurement list, the CoMP hypothesis is a first CoMP hypothesis, and the Benefit Metric is a first Benefit Metric, the method further comprising: receiving a second RSRP measurement list, a second CoMP hypothesis, and a second Benefit Metric from a third base station (BS-C); and scheduling downlink transmissions based on the first and second RSRP measurement lists, the first and second CoMP hypotheses, and the first and second Benefit Metrics.

Embodiment 48. The method of Embodiment 47 further comprising: normalizing the first and second Benefit Metrics based on the first and second RSRP measurement lists to determine normalized first and second Benefit Metrics, wherein scheduling comprises scheduling downlink transmissions based on the first and second RSRP measurement lists, the first and second CoMP hypotheses, and the normalized first and second Benefit Metrics.

Embodiment 49. The method of any of Embodiments 45-48 wherein scheduling comprises scheduling downlink transmissions of the first base station (BS-B), the method further comprising: transmitting a Relative Narrowband Transmission Power (RNTP) Information Element (IE) including a RNTP per physical resource block (PRB) and a RNTP threshold, wherein the RNTP threshold indicates a downlink transmission power threshold for the first base station (BS-B) and the RNTP per PRB indicates on a physical resource block basis for the first base station (BS-B) physical resource blocks for which downlink transmission is below the downlink transmission power indicated by the second RNTP threshold and/or physical resource blocks for which downlink transmission is above the downlink transmission power indicated by the second RNTP threshold.

Embodiment 50. The method of any of Embodiments 41-49 wherein receiving the RSRP measurement list, the CoMP hypothesis, and the Benefit Metric comprises receiving the RSRP measurement list, the CoMP hypothesis, and the Benefit Metric from the second base station (BS-A) over an X2 Interface.

Embodiment 51. The method of any of Embodiments 41-50 wherein receiving the RSRP measurement list, the CoMP hypothesis, and the Benefit Metric comprises receiving the RSRP measurement list, the CoMP hypothesis, and the Benefit Metric from the second base station (BS-A) as elements of a Load Information message.

Embodiment 52. The method of any of Embodiments 41-51 wherein the CoMP hypothesis identifies downlink resources for interference protection.

Embodiment 53. The method of any of Embodiments 41-46 and 49-52 wherein the CoMP hypothesis comprises a first CoMP hypothesis, the method further comprising: transmitting a second CoMP hypothesis to the second base station (BS-A), wherein the second CoMP hypothesis defines a resource allocation for downlink transmissions from the second base station (BS-A).

Embodiment 54. The method of Embodiment 53 further comprising: transmitting a Relative Narrowband Transmission Power (RNTP) Information Element (IE), wherein the RNTP IE includes a dummy value in a RNTP per physical resource block (PRB) and a RNTP threshold, wherein the dummy value identifies the RNTP threshold as defining a maximum power for interference protected resources identified by the second CoMP hypothesis for downlink transmission from the second base station (BS-A).

Embodiment 55. The method of Embodiments 55 wherein the RNTP IE is a first RNTP IE, the method further comprising: transmitting a second RNTP IE including a second RNTP per physical resource block (PRB) and a second RNTP threshold, wherein the second RNTP threshold indicates a downlink transmission power threshold for the first base station (BS-B) and the second RNTP per PRB indicates on a physical resource block basis for the first base station (BS-B) physical resource blocks for which downlink transmission is below the downlink transmission power indicated by the second RNTP threshold and/or physical resource blocks for which downlink transmission is above the downlink transmission power indicated by the second RNTP threshold.

Embodiment 56. The method of any of Embodiments 53-55 further comprising: transmitting a third CoMP hypothesis to third base station (BS-C), wherein the third CoMP hypothesis defines a resource allocation for downlink transmissions from the third base station (BS-C).

Embodiment 57. The method of any of Embodiments 47 and 49-52 further comprising: normalizing the first Benefit Metric based on the first and second RSRP measurement lists to determine normalized first Benefit Metric, wherein scheduling comprises scheduling downlink transmissions based on the first RSRP measurement list, the first CoMP hypothesis, and the normalized first Benefit Metric.

Embodiment 58. A base station (BS) of a radio access network adapted to perform according to any one of embodiments 1-57.

Embodiment 59. A base station (BS) of a Radio Access Network (RAN), the base station comprising: a transceiver (1401) configured to provide radio communications with a plurality of wireless terminals; a network interface (1405) configured to provide communications with other base stations of the RAN; and a processor (1403) coupled to the transceiver and the network interface, wherein the processor is adapted to perform according to any one of embodiments 1-57.

Embodiment 60. A base station (BS) of a Radio Access Network (RAN), the base station comprising: a transceiver (1401) configured to provide radio communications with a plurality of wireless terminals; a network interface (1405) configured to provide communications with other base stations of the RAN; and a processor (1403) coupled to the transceiver and the network interface; and a memory (1407) coupled to the processor and comprising computer readable program code that when executed by the processor (1403) causes the processor to perform operations according to any one of Embodiments 1-57

Further Definitions:

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

In the drawings and specification, there have been disclosed typical preferred embodiments of the invention and, although specific terms are employed, they are used in a generic and descriptive sense only and not for purposes of limitation, the scope of inventive concepts being set forth in the following claims.

That which is claimed is:

1. A method of operating a first base station in a Radio Access Network (RAN) including the first base station and a second base station, the method comprising:
    receiving a first Reference Signal Received Power (RSRP) measurement list, a first Coordinated Multipoint (CoMP) hypothesis, and a first Benefit Metric at the first base station from the second base station;
    receiving a second RSRP measurement list, a second CoMP hypothesis, and a second Benefit Metric from a third base station;
    normalizing the first and second Benefit Metric based on the first and second RSRP measurement lists to determine a normalized first and second Benefit Metric; and
    scheduling downlink transmissions based on the first and second RSRP measurement lists, the first and second CoMP hypotheses, and the normalized first and second Benefit Metrics.

2. The method of claim 1 wherein the first CoMP hypothesis defines a hypothetical resource allocation, and wherein the first Benefit Metric defines a benefit to the second base station associated with the hypothetical resource allocation defined by the first CoMP hypothesis.

3. The method of claim 2 wherein the hypothetical resource allocation defined by the first CoMP hypothesis is associated with the first base station.

4. The method of claim 1 wherein the first RSRP measurement list is based on RSRP measurements transmitted by wireless terminals to the second base station.

5. The method of claim 1 wherein scheduling comprises evaluating a real benefit to the second base station based on the first RSRP measurement list and the first Benefit Metric.

6. The method of claim 1, the method further comprising:
    transmitting a Relative Narrowband Transmission Power (RNTP) Information Element (IE) including a RNTP per physical resource block (PRB) and a RNTP threshold, wherein the RNTP threshold indicates a downlink transmission power threshold for the first base station and the RNTP per PRB indicates on a physical resource block basis for the first base station physical resource blocks for which downlink transmission is below the downlink transmission power indicated by the RNTP threshold and/or physical resource blocks for which downlink transmission is above the downlink transmission power indicated by the RNTP threshold.

7. The method of claim 1 the method further comprising:
    transmitting a third CoMP hypothesis to the second base station, wherein the third CoMP hypothesis defines a resource allocation for downlink transmissions from the second base station.

8. The method of claim 7 further comprising:
    transmitting a Relative Narrowband Transmission Power (RNTP) Information Element (IE), wherein the RNTP IE includes a dummy value in a RNTP per physical resource block (PRB) and a RNTP threshold, wherein the dummy value identifies the RNTP threshold as defining a maximum power for interference protected resources identified by the third CoMP hypothesis for downlink transmission from the second base station.

9. The method of claim 8 wherein the RNTP IE is a first RNTP IE and wherein the RNTP threshold is a first RNTP threshold, the method further comprising:
    transmitting a second RNTP IE including a second RNTP per physical resource block (PRB) and a second RNTP threshold, wherein the second RNTP threshold indicates a downlink transmission power threshold for the first base station and the second RNTP per PRB indicates on a physical resource block basis for the first base station physical resource blocks for which downlink transmission is below the downlink transmission power indicated by the second RNTP threshold and/or physical resource blocks for which downlink transmission is above the downlink transmission power indicated by the second RNTP threshold.

10. The method of claim 1, wherein the first RSRP measurement list is based on RSRP measurements transmitted by wireless terminals to the second base station.

11. The method of claim 1, wherein receiving the first RSRP measurement list, the first CoMP hypothesis, and the first Benefit Metric comprises receiving the first RSRP measurement list, the first CoMP hypothesis, and the first Benefit Metric at the first base station from the second base station over an X2 Interface.

12. The method of claim 1, wherein receiving the first RSRP measurement list, the first CoMP hypothesis, and the first Benefit Metric comprises receiving the first RSRP measurement list, the first CoMP hypothesis, and the first Benefit Metric at the first base station from the second base station as elements of a Load Information message.

13. The method of claim 1, wherein the first CoMP hypothesis identifies downlink resources for interference protection.

14. A first base station (BS) of a Radio Access Network (RAN) including the first base station and a second base station, the first base station comprising:
- a transceiver configured to provide radio communications with a plurality of wireless terminals;
- a network interface configured to provide communications with other base stations of the RAN; and
- a processor coupled to the transceiver and the network interface, wherein the processor is adapted to,
  - receive a first Reference Signal Received Power (RSRP) measurement list, a first Coordinated Multipoint (CoMP) hypothesis, and a first Benefit Metric at the first base station from the second base station;
  - receive a second RSRP measurement list, a second CoMP hypothesis, and a second Benefit Metric from a third base station;
  - normalize the first and second Benefit Metrics based on the first and second RSRP measurement lists to determine normalized first and second Benefit Metrics, and
  - schedule downlink transmissions based on the first and second RSRP measurement lists, the first and second CoMP hypotheses, and the first and normalized second Benefit Metrics.

15. The first base station of claim 14 wherein the first CoMP hypothesis defines a hypothetical resource allocation, and wherein the first Benefit Metric defines a benefit to the second base station associated with the hypothetical resource allocation defined by the first CoMP hypothesis.

16. The first base station of claim 15 wherein the hypothetical resource allocation defined by the first CoMP hypothesis is associated with the first base station.

17. The first base station of claim 14 wherein the first RSRP measurement list is based on RSRP measurements transmitted by wireless terminals to the second base station.

18. The first base station of claim 14 wherein the processor is adapted to schedule by evaluating a real benefit to the second base station based on the first RSRP measurement list and the first Benefit Metric.

19. The first base station of claim 14, wherein the processor is further adapted to:
- transmit a Relative Narrowband Transmission Power (RNTP) Information Element (IE) including a RNTP per physical resource block (PRB) and a RNTP threshold, wherein the RNTP threshold indicates a downlink transmission power threshold for the first base station and the RNTP per PRB indicates on a physical resource block basis for the first base station physical resource blocks for which downlink transmission is below the downlink transmission power indicated by the RNTP threshold and/or physical resource blocks for which downlink transmission is above the downlink transmission power indicated by the RNTP threshold.

20. The first base station of claim 19, wherein the processor is further adapted to:
- transmit a third CoMP hypothesis to the second base station, wherein the third CoMP hypothesis defines a resource allocation for downlink transmissions from the second base station.

* * * * *

UNITED STATES PATENT AND TRADEMARK OFFICE
CERTIFICATE OF CORRECTION

| | |
|---|---|
| PATENT NO. | : 9,654,262 B2 |
| APPLICATION NO. | : 14/769279 |
| DATED | : May 16, 2017 |
| INVENTOR(S) | : Centonza et al. |

It is certified that error appears in the above-identified patent and that said Letters Patent is hereby corrected as shown below:

In the Drawings

Figure 7:
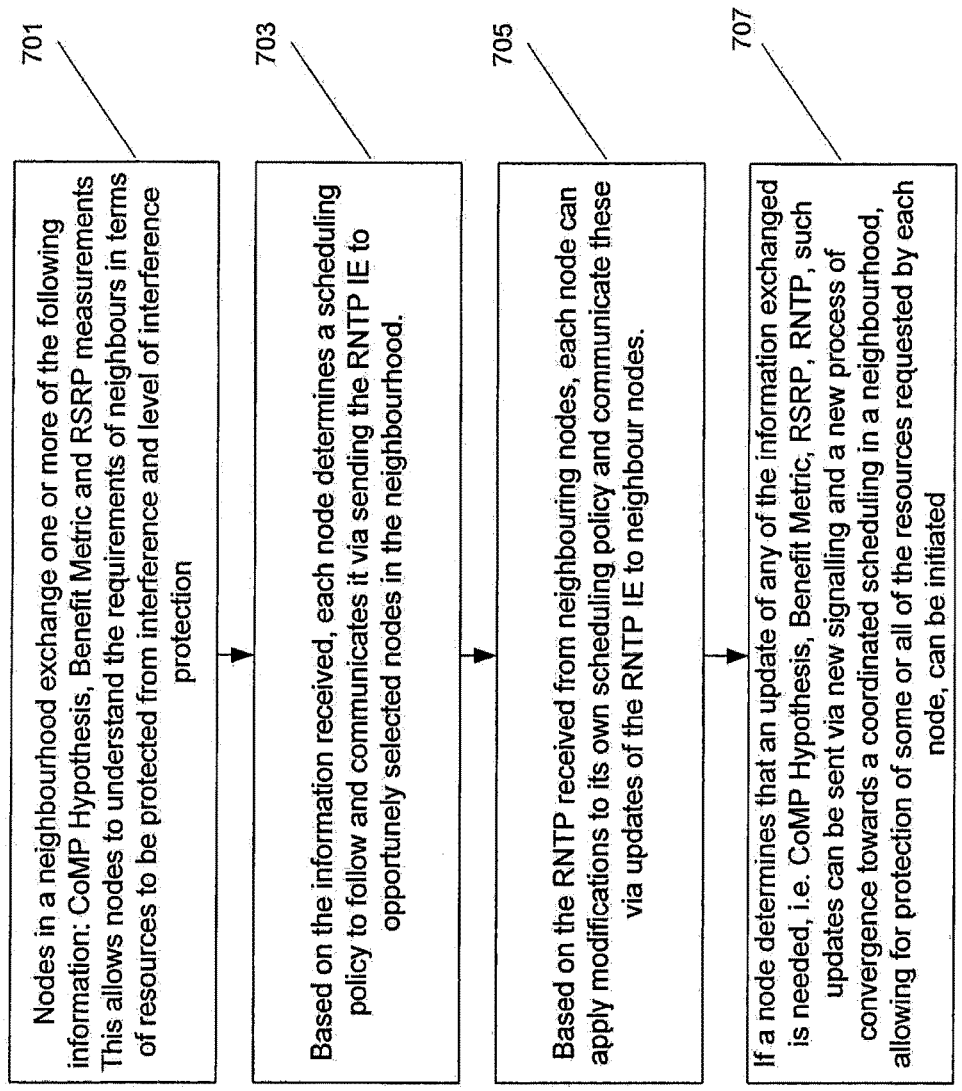
FIG. 7 is a flow chart illustrating operations covering distributed architectures according to some embodiments of inventive concepts.

In Fig. 7, Sheet 7 of 18, for Step "701", in Line 2, delete "measurements" and insert -- measurements. --, therefor.

In Fig. 12, Sheet 14 of 18, for Step "1201", in Line 3, delete "measurements" and insert -- measurements. --, therefor.

In the Specification

In Column 3, Line 33, delete "Received Narrow" and insert -- Relative Narrowband --, therefor.

In Column 6, Line 40, delete "Physical" and insert -- physical --, therefor.

In Column 7, Line 56, delete "architecture an" and insert -- architecture of an --, therefor.

In Column 8, Line 4, delete "example" and insert -- example of --, therefor.

In Column 9, Line 2, delete "channel Similarly," and insert -- channel. Similarly, --, therefor.

In Column 9, Line 4, delete "eNBs. but" and insert -- eNBs. But --, therefor.

In Column 13, Line 44, delete "scheduling"" and insert -- scheduling". --, therefor.

In Column 13, Line 55, delete "message" and insert -- message. --, therefor.

In Column 14, Line 9, delete "received)" and insert -- received). --, therefor.

In Column 14, Line 26, delete "messages" and insert -- messages. --, therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,654,262 B2

In Column 14, Line 38, delete "Global Cell" and insert -- Cell Global --, therefor.

In Column 16, Line 43, delete "interference" and insert -- interference. --, therefor.

In Column 17, Line 7, delete "RNTP" and insert -- RNTP. --, therefor.

In Column 17, Line 23, delete "improvement/optimization" and insert
-- improvement/optimization. --, therefor.

In Column 17, Line 29, delete "sent" and insert -- sent. --, therefor.

In Column 17, Line 34, delete "message(s)" and insert -- message(s). --, therefor.

In Column 18, Line 18, delete "13S-B" and insert -- BS-B) --, therefor.

In Column 19, Line 32, delete "RNTP TB" and insert -- RNTP IE --, therefor.

In Column 21, Line 11, delete "RNTP ID." and insert -- RNTP IE. --, therefor.

In Column 21, Line 23, delete "FRB" and insert -- PRB --, therefor.

In Column 24, Line 20, delete "first base station (UE-A)" and insert -- first base station (BS-A) --,
therefor.

In Column 27, Line 32, delete "1-57" and insert -- 1-57. --, therefor.

In Column 28, Lines 50-51, delete "(DVD/BlueRay)." and insert -- (DVD/BluRay). --, therefor.

In the Claims

In Column 30, Line 21, in Claim 7, delete "claim 1" and insert -- claim 1, --, therefor.

In Column 31, Lines 20-21, in Claim 14, delete "Metrics, and" and insert -- Metrics; and --, therefor.